United States Patent
Choi et al.

(10) Patent No.: US 11,265,578 B2
(45) Date of Patent: Mar. 1, 2022

(54) VIDEO DECODING METHOD AND APPARATUS BY CHROMA-MULTI-TRANSFORM, AND VIDEO ENCODING METHOD AND APPARATUS BY CHROMA-MULTI-TRANSFORM

(71) Applicant: SAMSUNG ELECTRONICS CO., LTD., Suwon-si (KR)

(72) Inventors: Ki-ho Choi, Seoul (KR); Min-soo Park, Seoul (KR); Alexander Alshin, Seoul (KR); Elena Alshina, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 690 days.

(21) Appl. No.: 16/075,439

(22) PCT Filed: Feb. 3, 2017

(86) PCT No.: PCT/KR2017/001225
§ 371 (c)(1),
(2) Date: Aug. 3, 2018

(87) PCT Pub. No.: WO2017/135759
PCT Pub. Date: Aug. 10, 2017

(65) Prior Publication Data
US 2021/0203990 A1 Jul. 1, 2021

Related U.S. Application Data

(60) Provisional application No. 62/291,134, filed on Feb. 4, 2016.

(51) Int. Cl.
*H04N 19/61* (2014.01)
*H04N 19/159* (2014.01)
(Continued)

(52) U.S. Cl.
CPC .......... *H04N 19/61* (2014.11); *H04N 19/159* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 2012/0230394 A1* | 9/2012 | Lu | ........................ H04N 19/186 375/240.02 |
| 2013/0301705 A1 | 11/2013 | Seregin et al. | |

(Continued)

FOREIGN PATENT DOCUMENTS

| | | |
|---|---|---|
| EP | 3104608 A1 | 12/2016 |
| KR | 10-2012-0082375 A | 7/2012 |

(Continued)

OTHER PUBLICATIONS

Adria Arrufat, "Multiple tranforms for video coding," Doctor Thesis submitted Dec. 11, 2015.*

(Continued)

*Primary Examiner* — Michael J Hess
(74) *Attorney, Agent, or Firm* — Sughrue Mion, PLLC

(57) ABSTRACT

Provided are a method and apparatus for performing transformation and inverse transformation on a chroma block by using a variable transform kernel, during video encoding and decoding processes. A video decoding method includes: obtaining, from a bitstream, chroma multi-transform kernel information indicating whether a chroma transform kernel for inverse transformation of a chroma block is determined to be among a plurality of chroma transform kernels; while determining whether the chroma transform kernel is determined to be among the plurality of chroma transform kernels according to the chroma multi-transform kernel information, determining whether to determine the chroma transform (Continued)

kernel by using a luma transform kernel; and performing inverse transformation on the chroma block by using the chroma transform kernel.

3 Claims, 19 Drawing Sheets

(51) Int. Cl.
*H04N 19/176* (2014.01)
*H04N 19/186* (2014.01)

(56) References Cited

U.S. PATENT DOCUMENTS

| | | | |
|---|---|---|---|
| 2014/0140393 A1* | 5/2014 | Seregin | H04N 19/12 |
| | | | 375/240.2 |
| 2014/0254675 A1 | 9/2014 | Lee et al. | |
| 2015/0249828 A1* | 9/2015 | Rosewarne | H04N 19/136 |
| | | | 375/240.02 |
| 2016/0029039 A1 | 1/2016 | Jeong et al. | |
| 2017/0366824 A1* | 12/2017 | Hsu | H04N 19/61 |

FOREIGN PATENT DOCUMENTS

| | | |
|---|---|---|
| KR | 10-2012-0091413 A | 8/2012 |
| KR | 10-2014-0119823 A | 10/2014 |
| KR | 10-2015-0048804 A | 5/2015 |
| KR | 10-2015-0105184 A | 9/2015 |
| WO | 2014/071439 A1 | 5/2014 |

OTHER PUBLICATIONS

Karczewicz, et al., "Study of coding efficiency improvements beyond HEVC", Oct. 2015, International Organization for Standardisation, ISO/IEC JTC1/SC29/WG11 MPEG2015/M37102, 13 pages total.
Search Report dated May 16, 2017, issued by the International Searching Authority in counterpart International Patent Application No. PCT/KR2017/001225 (PCT/ISA/210).
Written Opinion dated May 16, 2017, issued by the International Searching Authority in counterpart International Patent Application No. PCT/KR2017/001225 (PCT/ISA/237).
Communication dated Dec. 7, 2018, issued by the European Patent Office in counterpart European Application No. 17747804.7.
Kiho Choi et al., "Adaptive Multiple Transform for Chroma", Joint Video Exploration Team (JVET) of ITU-T SG 16 WP 3 and ISO/IEC JTC 1/SC 29/WG 11, 2nd Meeting, JVET-B0033, Feb. 21, 2016, pp. 1-6 (6 pages total).

* cited by examiner

FIG. 6

| INTRA MODE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| HORIZONTAL TRANSFORM KERNEL CANDIDATE | 2 | 1 | 0 | 1 | 0 | 1 | 0 | 1 | 2 | 2 | 2 | 2 | 2 | 1 | 0 | 1 | 0 | 1 | 0 | 1 | 0 | 1 | 0 | 1 | 0 | 0 | 0 | 0 | 0 | 1 | 0 | 1 | 0 | 1 | 0 |
| VERTICAL TRANSFORM KERNEL CANDIDATE | 2 | 1 | 0 | 1 | 0 | 1 | 0 | 1 | 0 | 0 | 0 | 0 | 0 | 1 | 0 | 1 | 0 | 1 | 0 | 1 | 0 | 1 | 0 | 1 | 2 | 2 | 2 | 2 | 2 | 1 | 0 | 1 | 0 | 1 | 0 |

FIG. 7

```
                                                              ,710
if ( Slice_Intra_Chroma_AMT=1){
        if( Luma_Cbf != 0){
                if (Chroma_TU_Size >4){          → Case1
                }else
                        if (Partition=2Nx2N)     → Case1
                        else                     → Case2
        }else                                    → Case3
}else                                            → Case3
```

| | | |
|---|---|---|
| Case1: if (Luma_ATM_CU=1) | H: LumaAMT, V: LumaAMT | |
| else | H: DCT2, V: DCT2 | |
| Case2: if (Luma_ATM_CU=1) | H: DST7, V: DST7 | |
| else | H: DCT2, V: DCT2 | |
| Case3: | H: DCT2, V:DCT2 | |

```
                                                              ,810
if ( Slice_Inter_Chroma_AMT=1){
        if( Luma_Cbf != 0){
                if (Chroma_TU_Size >4){          → Case1
                }else                            → Case2
        }else                                    → Case3
}else                                            → Case3
```

| | |
|---|---|
| Case1: if (Luma_ATM_CU=1) | H: LumaAMT, V: LumaAMT |
| else | H: DCT2, V: DCT2 |
| Case2: if (Luma_ATM_CU=1) | H: DST7, V: DST7 |
| else | H: DCT2, V: DCT2 |
| Case3: | H: DCT2, V:DCT2 |

820

FIG. 11
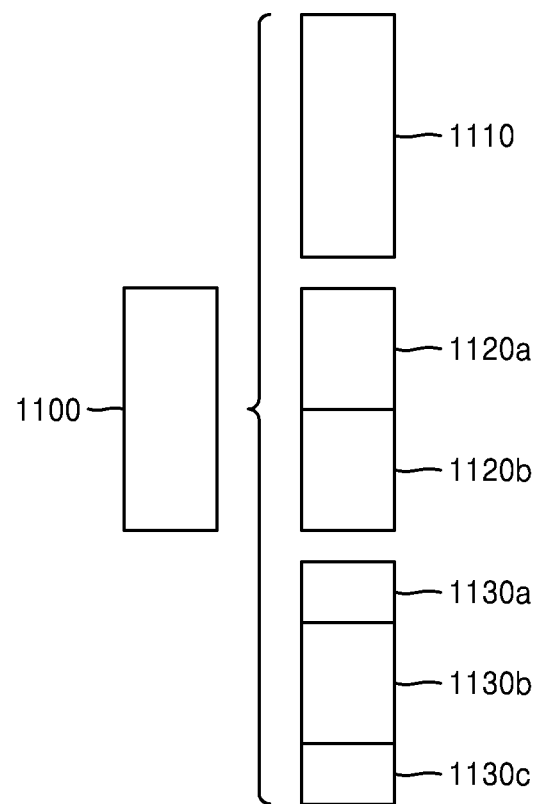
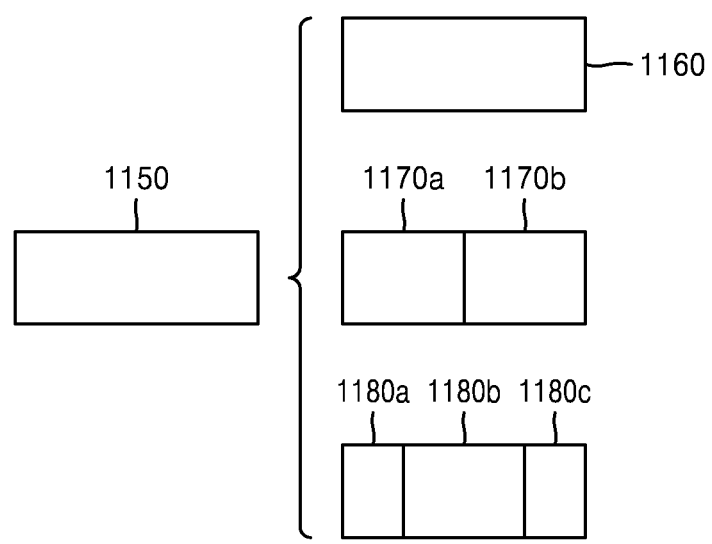

FIG. 20

| BLOCK SHAPE<br>DEPTH | 0: SQUARE | 1: NS_VER | 2: NS_HOR |
|---|---|---|---|
| DEPTH D | ☐ — 2000 | ☐ — 2010 | ☐ — 2020 |
| DEPTH D+1 | ☐ — 2002 | ☐ — 2012 | ☐ — 2022 |
| DEPTH D+2 | ☐ — 2004 | ☐ — 2014 | ☐ — 2024 |
| ... | ... | ... | ... |

VIDEO DECODING METHOD AND APPARATUS BY CHROMA-MULTI-TRANSFORM, AND VIDEO ENCODING METHOD AND APPARATUS BY CHROMA-MULTI-TRANSFORM

TECHNICAL FIELD

The present disclosure relates to a video decoding method and video decoding apparatus, and more particularly, to a method and apparatus for performing transformation and inverse transformation on a chroma block by using a transform kernel selectable according to various encoding/decoding conditions.

BACKGROUND ART

Image data is encoded using a codec according to a certain data compression standard, for example, the moving picture expert group (MPEG) standard, and then is stored in a recording medium or transmitted through a communication channel in a form of a bitstream.

With development and supply of hardware capable of reproducing and storing high resolution or high definition image content, a necessity for a codec that effectively encodes or decodes the high resolution or high definition image content is increasing. Encoded image content may be reproduced by being decoded. Recently, methods of effectively compressing such high resolution or high definition image content have been executed. For example, image compression technology that is effectively implemented via processes of splitting an image to be encoded using an arbitrary method or processes of manipulating data has been suggested.

As one of techniques of manipulating data, a transform technique of transforming data of a spatial domain to data of a frequency domain by performing frequency transformation is used. Generally, in compression standards, as transform kernels (transform matrices) used for transformation and inverse transformation should be the same during an encoding process and decoding process, it is common to use a fixed transform kernel.

DESCRIPTION OF EMBODIMENTS

Technical Problem

Provided are a method and apparatus for performing transformation and inverse transformation on a chroma block by using a variable transform kernel, by enabling a transform kernel for performing the transformation and the inverse transformation on the chroma block to be selectable using various transform kernel candidates according to a certain condition, during video encoding and decoding processes.

Solution to Problem

According to an aspect of the present disclosure, a video decoding method includes: obtaining, from a bitstream, chroma multi-transform kernel information indicating whether a chroma transform kernel for inverse transformation of a chroma block is determined to be among a plurality of chroma transform kernels; while determining whether the chroma transform kernel is determined to be among the plurality of chroma transform kernels according to the chroma multi-transform kernel information, determining whether to determine the chroma transform kernel by using a luma transform kernel; and performing inverse transformation on the chroma block by using the chroma transform kernel.

According to another aspect of the present disclosure, a video decoding apparatus includes: a parser configured to obtain, from a bitstream, chroma multi-transform kernel information indicating whether a chroma transform kernel for inverse transformation of a chroma block is determined to be among a plurality of chroma transform kernels; and an inverse transformer configured to, while determining whether the chroma transform kernel is determined to be among the plurality of chroma transform kernels according to the chroma multi-transform kernel information, determine whether to determine the chroma transform kernel by using a luma transform kernel, and perform inverse transformation on the chroma block by using the chroma transform kernel.

According to an aspect of the present disclosure, a video encoding method includes: performing transformation on a chroma block by using a certain transform kernel determined independently from a luma transform kernel for transformation of a luma block, and a chroma transform kernel determined by using the luma transform kernel; and generating chroma multi-transform kernel information indicating whether the chroma transform kernel is determined to be among a plurality of chroma transform kernels; and encoding the chroma multi-transform kernel information and a transformation coefficient generated by performing the transformation on the chroma block.

According to an aspect of the present disclosure, a video encoding apparatus includes: a transformer configured to perform transformation on a chroma block by using a certain transform kernel determined independently from a luma transform kernel for transformation of a luma block, and a chroma transform kernel determined by using the luma transform kernel; and an encoder configured to generate chroma multi-transform kernel information indicating whether the chroma transform kernel is determined to be among a plurality of chroma transform kernels, and encode the chroma multi-transform kernel information and a transformation coefficient generated by performing the transformation on the chroma block.

Advantageous Effects of Disclosure

Since a transform kernel for performing transformation and inverse transformation on a chroma block is selectable according to a certain standard during video encoding and decoding processes, energy compression performance according to the transformation and the inverse transformation on the chroma block can be increased by using a transform kernel selected by considering a certain encoding condition or decoding condition. Also, performance degradation of chroma transformation, which may occur when a luma transform kernel is variably used whereas a chroma transform kernel is fixedly used, can be prevented.

BRIEF DESCRIPTION OF DRAWINGS

FIG. 6 illustrates a table of combinations of horizontal transform kernel candidates and vertical transform kernel candidates, which change according to an intra prediction mode.

FIG. 7 illustrates syntax for determining an intra chroma block according to a luma multi-transform kernel, according to an embodiment.

FIG. 8 illustrates syntax for determining an inter chroma block according to a luma multi-transform kernel, according to an embodiment.

FIG. 11 illustrates processes of determining at least one coding unit when a coding unit having a non-square shape is split, according to an embodiment.

FIG. 20 illustrates processes of determining a depth of a coding unit as a shape and size of the coding unit are changed, when a plurality of coding units are determined when the coding unit is recursively split, according to an embodiment.

BEST MODE

Figure 1:
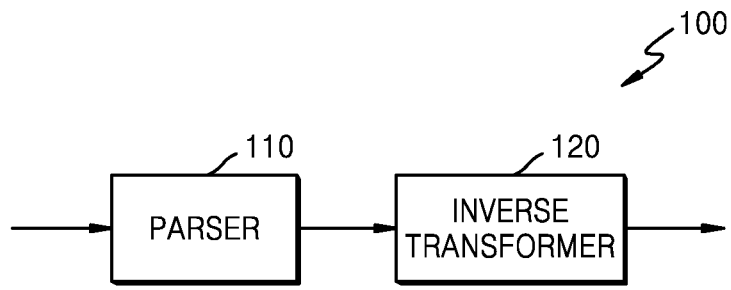
FIG. 1 is a block diagram of a video decoding apparatus according to an embodiment.

According to an aspect of the present disclosure, a video decoding method includes: obtaining, from a bitstream, chroma multi-transform kernel information indicating whether a chroma transform kernel for inverse transformation of a chroma block is determined to be among a plurality of chroma transform kernels; while determining whether the chroma transform kernel is determined to be among the plurality of chroma transform kernels according to the chroma multi-transform kernel information, determining whether to determine the chroma transform kernel by using a luma transform kernel; and performing inverse transformation on the chroma block by using the chroma transform kernel.

The obtaining of the chroma multi-transform kernel information may include obtaining, from the bitstream, intra chroma multi-transform kernel information indicating whether an intra chroma transform kernel for a chroma block encoded in an intra prediction mode is determined to be among the plurality of chroma transform kernels, and inter chroma multi-transform kernel information indicating whether an inter chroma transform kernel for a chroma block encoded in an inter prediction mode is determined to be among the plurality of chroma transform kernels.

The obtaining of the chroma multi-transform kernel information may include: obtaining, from the bitstream, luma multi-transform kernel information indicating whether a luma transform kernel for inverse transformation of a luma block is determined to be among a plurality of luma transform kernels; and when the luma transform kernel is determined to be among the plurality of luma transform kernels according to the luma multi-transform kernel information, determining the chroma transform kernel from among the plurality of chroma transform kernels according to the luma transform kernel.

The obtaining of the chroma multi-transform kernel information may include obtaining, from the bitstream, at least one of: coding unit level chroma multi-transform kernel information indicating whether the chroma transform kernel is determined to be among the plurality of chroma transform kernels, in a current coding unit; slice level chroma multi-transform kernel information indicating whether the chroma transform kernel is determined to be among the plurality of chroma transform kernels, in a current slice; picture level chroma multi-transform kernel information indicating whether the chroma transform kernel is determined to be among the plurality of chroma transform kernels, in a current picture; and sequence level chroma multi-transform kernel information indicating whether the chroma transform kernel is determined to be among the plurality of chroma transform kernels, in a current sequence.

The determining of whether to determine the chroma transform kernel by using the luma transform kernel may include: obtaining, from the bitstream, vertical transform kernel information for determining a luma transform kernel for inverse transformation in a vertical direction, and horizontal transform kernel information for determining a luma transform kernel for inverse transformation in a horizontal direction; determining a chroma vertical transform kernel for the inverse transformation of the chroma block in the vertical direction, according to the vertical transform kernel information; and determining a chroma horizontal transform kernel for the inverse transformation of the chroma block in the horizontal direction, according to the horizontal transform kernel information.

The determining of whether to determine the chroma transform kernel by using the luma transform kernel may include, when the chroma block is encoded in an intra prediction mode, determining a combination of a chroma vertical transform kernel and a chroma horizontal transform kernel, based on the intra prediction mode indicating an intra prediction direction.

The determining of whether to determine the chroma transform kernel by using the luma transform kernel may include: obtaining, from the bitstream, luma multi-transform kernel information indicating whether a luma transform kernel for inverse transformation of a luma block is determined to be among a plurality of luma transform kernels; when a size of a chroma transformation block is larger than a certain size, determining the chroma transform kernel according to the luma multi-transform kernel information; when the size of the chroma transformation block is smaller than or equal to the certain size and a size of a prediction block corresponding to the chroma transformation block is 2N×2N, determining the chroma transform kernel according to the luma transform kernel; and when the size of the chroma transformation block is smaller than or equal to the certain size and the size of the prediction block corresponding to the chroma transformation block is not 2N×2N, determining the chroma transform kernel independently from the luma transform kernel.

The determining of whether to determine the chroma transform kernel by using the luma transform kernel may further include, when the luma transform kernel is not determined to be among the plurality of luma transform kernels according to the luma multi-transform kernel information, determining a certain transform kernel as the chroma transform kernel.

According to another aspect of the present disclosure, a video decoding apparatus includes: a parser configured to obtain, from a bitstream, chroma multi-transform kernel information indicating whether a chroma transform kernel for inverse transformation of a chroma block is determined to be among a plurality of chroma transform kernels; and an inverse transformer configured to, while determining whether the chroma transform kernel is determined to be among the plurality of chroma transform kernels according to the chroma multi-transform kernel information, determine whether to determine the chroma transform kernel by using a luma transform kernel, and perform inverse transformation on the chroma block by using the chroma transform kernel.

According to an aspect of the present disclosure, a video encoding method includes: performing transformation on a chroma block by using a certain transform kernel determined independently from a luma transform kernel for transformation of a luma block, and a chroma transform kernel determined by using the luma transform kernel; and generating chroma multi-transform kernel information indicating whether the chroma transform kernel is determined to be among a plurality of chroma transform kernels; and encoding the chroma multi-transform kernel information and a transformation coefficient generated by performing the transformation on the chroma block.

The generating of the chroma multi-transform kernel information may include generating intra chroma multi-transform kernel information indicating whether an intra chroma transform kernel for a chroma block encoded in an intra prediction mode is determined to be among the plurality of chroma transform kernels, and an inter chroma multi-transform kernel information indicating whether an inter chroma transform kernel for a chroma block encoded in an inter prediction mode is determined to be among the plurality of chroma transform kernels.

The video encoding method may further include: when the luma transform kernel for the transformation of the luma block is determined to be among a plurality of luma transform kernels, determining the chroma transform kernels from among the plurality of chroma transform kernels, according to the luma transform kernel; and encoding luma multi-transform kernel information indicating whether the luma transform kernel is determined to be among the plurality of luma transform kernels.

The video encoding method may further include: generating luma vertical transform kernel information for determining a luma vertical transform kernel for transformation of the luma block in a vertical direction, and luma horizontal transform kernel information for determining a luma horizontal transform kernel for transformation of the luma block in a horizontal direction; determining a chroma vertical transform kernel for transformation of the chroma block in the vertical direction, according to the luma vertical transform kernel; and determining a chroma horizontal transform kernel for transformation of the chroma block in the horizontal direction, according to the luma horizontal transform kernel.

The video encoding method may further include determining a combination of a chroma vertical transform kernel and a chroma horizontal transform kernel, based on an intra prediction mode indicating an intra prediction direction, when the chroma block is encoded in the intra prediction mode.

The video encoding method may further include: when a size of a chroma transformation block is larger than a certain size, determining the chroma transform kernel according to the luma transform kernel for the transformation of the luma block; when the size of the chroma transformation block is smaller than or equal to the certain size and a size of a prediction block corresponding to the chroma transformation block is 2N×2N, determining the chroma transform kernel according to the luma transform kernel; and when the size of the chroma transformation block is smaller than or equal to the certain size and the size of the prediction block corresponding to the chroma transformation block is not 2N×2N, determining the chroma transform kernel independently from the luma transform kernel, wherein the encoding may include encoding luma multi-transform kernel information indicating whether the luma transform kernel is determined to be among a plurality of luma transform kernels.

The encoding may include encoding at least one of: coding unit level chroma multi-transform kernel information indicating whether the chroma transform kernel is determined to be among the plurality of chroma transform kernels, in a current coding unit; slice level chroma multi-transform kernel information indicating whether the chroma transform kernel is determined to be among the plurality of chroma transform kernels, in a current slice; picture level chroma multi-transform kernel information indicating whether the chroma transform kernel is determined to be among the plurality of chroma transform kernels, in a current picture; and sequence level chroma multi-transform kernel information indicating whether the chroma transform kernel is determined to be among the plurality of chroma transform kernels, in a current sequence.

Mode of Disclosure

Advantages and features of one or more embodiments of the present specification and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the specification means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image or a dynamic image such as a moving image, i.e., a video itself.

Hereinafter, a "sample" is data allocated to a sampling location of an image and may mean data that is a processing target. For example, pixel values in an image of a spatial domain or transformation coefficients on a transformation domain may be samples. A unit including at least one sample may be defined as a block.

Reference will now be made in detail to embodiments, examples of which are illustrated in the accompanying drawings. In the following description, well-known functions or constructions are not described in detail so as not to obscure the embodiments with unnecessary detail.

Hereinafter, a video encoding apparatus, a video decoding apparatus, a video encoding method, and a video decoding method, according to embodiments are described with reference to FIGS. 1 through 23. In detail, a method and apparatus for performing transformation and inverse transformation on a chroma block by using a chroma transform kernel determined to be among a plurality of chroma transform kernels, according to embodiments, are described with reference to FIGS. 1 through 9, and a method of determining a data unit of an image, according to an embodiment, is described with reference to FIGS. 10 through 23.

Hereinafter, a method and apparatus for encoding or decoding a video by performing transformation and/or inverse transformation, according to an embodiment disclosed in the present specification, are described with reference to FIGS. 1 through 9.

FIG. 1 is a block diagram of a video decoding apparatus 100 according to an embodiment.

The video decoding apparatus 100 according to an embodiment may include a parser 110 and an inverse transformer 120. The parser 110 and the inverse transformer 120 according to embodiments may operate as individual processors, or may be controlled by a central processor. Also, although not shown in FIG. 1, the video decoding apparatus 100 may further include a memory or storage for storing data received from an external source and data generated by the parser 110 and inverse transformer 120.

The parser 110 may parse various syntaxes from a bitstream. Quantized transformation coefficients of a block may be obtained from the parsed various syntaxes by performing entropy encoding on the bitstream. The video decoding apparatus 100 may perform inverse quantization on the block by performing scaling on the quantized transformation coefficient, based on a certain quantization parameter. The transformation coefficients of the block may be obtained via the inverse quantization.

The video decoding apparatus 100 according to an embodiment may reconstruct a luma block and a chroma block, which are linked to each other, by decoding the bitstream. For example, when a luma transformation block is decoded, a chroma transformation block corresponding thereto may also be decoded. Accordingly, the video decoding apparatus 100 may obtain transformation coefficients of the luma block and transformation coefficients of the chroma block by decoding the bitstream.

The inverse transformer 120 according to an embodiment may obtain a residual sample of the luma block by performing inverse transformation on the luma block. In other words, the transformation coefficients of the luma block may be inverse-transformed by applying a transform kernel on the luma block, and accordingly, luma residual samples may be reconstructed.

Also, the inverse transformer 120 may obtain a residual sample of the chroma block by performing inverse transformation on the chroma block. In other words, the transformation coefficients of the chroma block may be inverse-transformed by applying a transform kernel on the chroma block, and accordingly, chroma residual samples may be reconstructed.

Since sizes of the luma block and the chroma block are different from each other, the transform kernel for inverse transformation of the luma block and the transform kernel for inverse transformation of the chroma block are different from each other.

However, in the video decoding apparatus 100 according to an embodiment, a luma transform kernel for inverse transformation of a luma block and a chroma transform kernel for inverse transformation of a chroma block may be linked and combined, and a combination of the luma transform kernel and the chroma transform kernel may be predetermined.

The parser 110 according to an embodiment may obtain, from the bitstream, chroma multi-transform kernel information indicating whether the chroma transform kernel for inverse transformation of the chroma block is determined to be among a plurality of chroma transform kernels, while performing entropy decoding.

The inverse transformer 120 according to an embodiment may determine whether to determine the chroma transform kernel by using the luma transform kernel, while determining whether the chroma transform kernel is determined to be among the plurality of chroma transform kernels, according to the chroma multi-transform kernel information. The chroma transform kernel may be determined by using the luma transform kernel or as a certain kernel, and the inverse transformer 120 may perform inverse transform on the chroma block by using the determined chroma transform kernel.

The video decoding apparatus 100 according to an embodiment may perform inverse transformation on the luma block by using the luma transform kernel.

The video decoding apparatus 100 may generate reconstruction samples of a spatial domain by combining a prediction sample of a block generated by performing prediction and residual samples of a block generated by performing inverse transformation. In detail, reconstruction samples of the luma block may be generated as a luma prediction sample and luma residual samples are combined, and reconstruction samples of the chroma block may be generated as a chroma prediction sample and chroma residual samples are combined.

Hereinafter, detailed operations of the video decoding apparatus 100 performing multi-transformation of a chroma block, according to an embodiment, are described with reference to FIG. 2.

Figure 2:
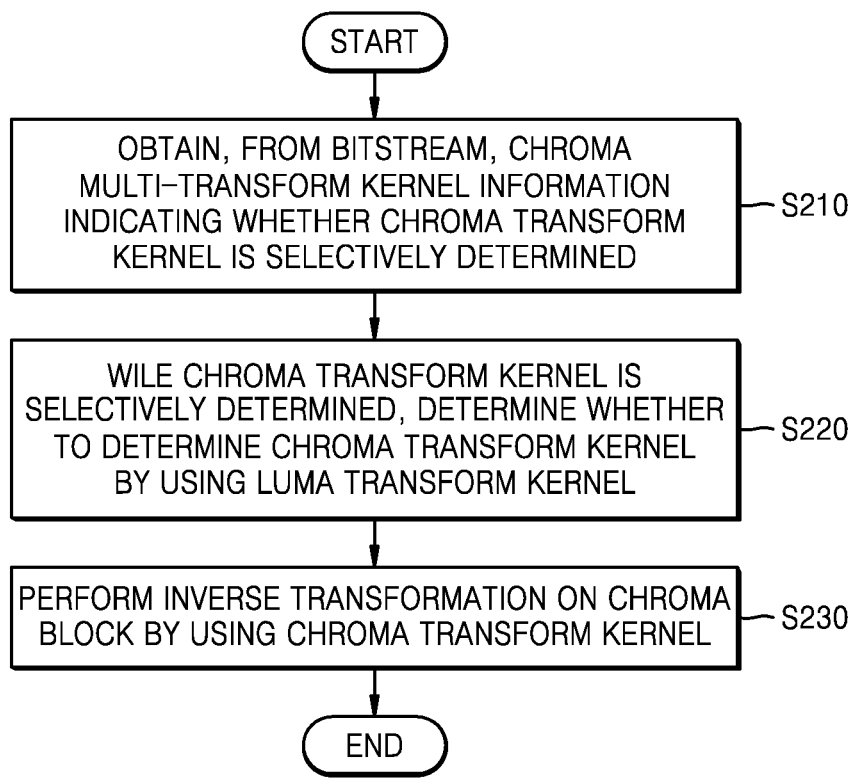
FIG. 2 is a flowchart of a video decoding method according to an embodiment.

FIG. 2 is a flowchart of a video decoding method according to an embodiment.

In operation S210, the video decoding apparatus 100 may obtain, from a bitstream, chroma multi-transform kernel information indicating whether a chroma transform kernel for inverse transformation of a chroma block is determined to be among a plurality of chroma transform kernels.

According to an embodiment, the video decoding apparatus 100 may obtain, from the bitstream, intra chroma multi-transform kernel information and inter chroma multi-transform kernel information. It may be determined whether an intra chroma transform kernel for a chroma block encoded in an intra prediction mode is determined to be among the plurality of chroma transform kernels, according to the intra chroma multi-transform kernel information. It may be determined whether an inter chroma transform kernel for a chroma block encoded in an inter prediction mode is determined to be among the plurality of chroma transform kernels, according to the inter chroma multi-transform kernel information.

According to an embodiment, the video decoding apparatus 100 may obtain, from the bitstream, luma multi-transform kernel information indicating whether a luma transform kernel for inverse transformation of a luma block is determined to be among a plurality of luma transform kernels. While determining whether the luma transform kernel is to be among the plurality of luma transform kernels according to the luma multi-transform kernel information, the chroma transform kernel may also be determined to be among the plurality of chroma transform kernels according to the luma transform kernel. According to an embodiment, when the luma transform kernel is not determined to be among the plurality of luma transform kernels according to the luma multi-transform kernel information, the video decoding apparatus 100 may determine a certain transform kernel as the chroma transform kernel.

In operation S220, while determining whether the chroma transform kernel is to be among the plurality of chroma transform kernels according to the chroma multi-transform kernel information, the video decoding apparatus 100 may determine whether to determine the chroma transform kernel by using the luma transform kernel. In detail, the chroma transform kernel may be determined according to the luma transform kernel when a certain condition is satisfied. When the certain condition is not satisfied, the chroma transform kernel may be determined independently from the luma transform kernel.

The video decoding apparatus 100 according to a detailed embodiment may obtain, from the bitstream, vertical transform kernel information for determining a luma transform kernel for inverse transformation in a vertical direction, and horizontal transform kernel information for determining a luma transform kernel for inverse transformation in a horizontal direction. The video decoding apparatus 100 may determine a chroma vertical transform kernel for inverse transformation in the vertical direction of the chroma block, according to the vertical transform kernel information. Also, the video decoding apparatus 100 may determine a chroma horizontal transform kernel for inverse transformation of the chroma block in the horizontal direction, according to the horizontal transform kernel information.

When the chroma block is encoded in the intra prediction mode, the video decoding apparatus 100 may determine a combination of the chroma vertical transform kernel and the chroma horizontal transform kernel based on the intra prediction mode indicating an intra prediction direction.

The video decoding apparatus 100 according to a detailed embodiment may obtain, from the bitstream, luma multi-transform kernel information indicating whether a luma transform kernel for inverse transformation of a luma block is determined to be among a plurality of luma transform kernels. When a size of a chroma transformation block is larger than a certain size, the video decoding apparatus 100 may determine the chroma transform kernel according to the luma multi-transform kernel information.

When the size of the chroma transformation block is smaller than or equal to the certain size, and a size of a prediction block corresponding to the chroma transformation block is 2N×2N, the video decoding apparatus 100 may determine the chroma transform kernel according to the luma transform kernel.

When the size of the chroma transformation block is smaller than or equal to the certain size, and the size of the prediction block corresponding to the chroma transformation block is not 2N×2N, the video decoding apparatus 100 may determine the chroma transform kernel independently from the luma transform kernel.

In operation S230, the video decoding apparatus 100 may perform inverse transformation on the chroma block by using the chroma transform kernel determined in operation S220.

According to an embodiment, the chroma multi-transform kernel information may be set individually per data unit, such as a block of a sequence, picture, slice, or coding unit.

In this regard, the video decoding apparatus 100 according to an embodiment may obtain, from the bitstream, sequence level chroma multi-transform kernel information, and determine whether the chroma transform kernel is determined to be among the plurality of chroma transform kernels in a current sequence, according to the sequence level chroma multi-transform kernel information. The video decoding apparatus 100 according to a detailed embodiment may parse the chroma multi-transform kernel information from a sequence parameter set (SPS) of the current sequence, and determine whether the chroma transform kernel for inverse transformation of the current sequence is variably set, according to the chroma multi-transform kernel information.

The video decoding apparatus 100 according to an embodiment may obtain, from the bitstream, picture level chroma multi-transform kernel information, and determine whether the chroma transform kernel is determined to be among the plurality of chroma transform kernels in a current picture, according to the picture level chroma multi-transform kernel information. The video decoding apparatus 100 according to a detailed embodiment may parse the chroma multi-transform kernel information from a picture parameter set (PPS) of the current picture, and determine whether the chroma transform kernel for inverse transformation of the current picture is variably set, according to the chroma multi-transform kernel information.

The video decoding apparatus 100 according to an embodiment may obtain, from the bitstream, slice level chroma multi-transform kernel information, and determine whether the chroma transform kernel is determined to be among the plurality of chroma transform kernels in a current slice, according to the slice level chroma multi-transform kernel information. The video decoding apparatus 100 according to a detailed embodiment may parse the chroma multi-transform kernel information from a slice header of the current slice, and determine whether the chroma transform kernel for inverse transformation of the current slice is variably set, according to the chroma multi-transform kernel information.

The video decoding apparatus 100 according to an embodiment may obtain, from the bitstream, coding unit level chroma multi-transform kernel information, and determine whether the chroma transform kernel is determined to be among the plurality of chroma transform kernels in a current coding unit, according to the coding unit level chroma multi-transform kernel information. The video decoding apparatus 100 according to a detailed embodiment may parse the chroma multi-transform kernel information from a coding unit syntax of the current coding unit, and determine whether the chroma transform kernel for inverse transformation of the current coding unit is variably set, according to the chroma multi-transform kernel information.

Accordingly, the video decoding apparatus 100 according to an embodiment determine whether the chroma transform kernel is determined to be among the plurality of chroma transform kernels per data unit, such as sequence, picture, slice, or coding unit, according to a parsed location of the chroma multi-transform kernel information, by parsing the chroma multi-transform kernel information from at least one of the coding unit syntax, the slice header, the PPS, and the SPS.

Figure 3:
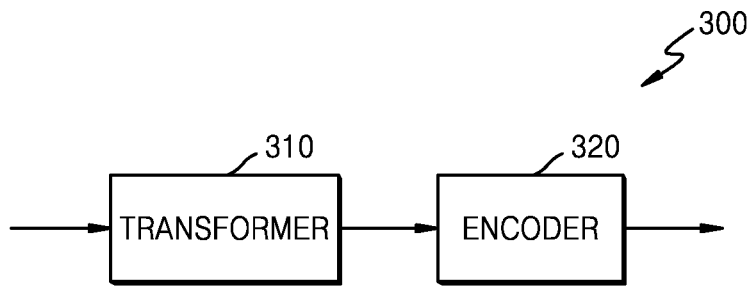
FIG. 3 is a block diagram of a video encoding apparatus according to an embodiment.

FIG. 3 is a block diagram of a video encoding apparatus 300 according to an embodiment.

The video encoding apparatus 300 according to an embodiment may include a transformer 310 and an encoder 320. The transformer 310 and the encoder 320 according to an embodiment may operate as individual processors, or may be controlled by a central processor. Also, although not shown in FIG. 3, the video encoding apparatus 300 may further include a memory or storage for storing input video data and data generated by the transformer 310 and the encoder 320.

The video encoding apparatus 300 according to an embodiment may split a picture into a plurality of blocks, so as to encode video data. Sizes of the blocks may vary, and hereinafter, the block is referred to as a coding unit. According to an embodiment, sizes of coding units may gradually change according to a hierarchical structure, a sub-block may be determined from the coding unit to perform transformation on the coding unit, and a sub-block for performing prediction on the coding unit may also be determined. Even when a sub-block is derived from one coding unit, sizes of a sub-block for transformation and a sub-block for prediction may be individually determined.

The video encoding apparatus 300 may determine prediction samples by performing prediction based on a prediction block, per encoding block. When prediction is performed in an intra prediction mode, the prediction samples may be determined by using sample values of neighboring blocks spatially adjacent to the prediction block. When prediction is performed in an inter prediction mode, the prediction samples may be determined by using samples of a block existing at a location temporally corresponding to a prediction block of a current picture in a reference picture.

The video encoding apparatus 300 may generate a residual sample considering prediction samples from a sample of each encoding block. The video encoding apparatus 300 may generate a quantized transformation coefficient by performing transformation and quantization on residual samples, based on a transformation block of each encoding block.

The video encoding apparatus 300 generates a quantized transformation coefficient by performing transformation and quantization on residual samples generated by performing prediction on an encoding block, and then reconstructs residual samples by performing inverse quantization and inverse transformation again. The reconstructed residual samples and prediction samples are added, and finally, reconstruction samples of a coding unit may be stored. The stored reconstruction samples may be used as reference samples for prediction of another coding unit.

The video encoding apparatus 300 according to an embodiment may encode a luma block and a chroma block, which are linked to each other, from among blocks of video data. For example, a luma transformation block may be encoded, and a chroma transformation block corresponding to the luma transformation block may be encoded. Accordingly, the video encoding apparatus 300 may generate luma transformation coefficients by performing transformation on the luma block, and generate chroma transformation coefficients by performing transformation on the chroma block.

The transformer 310 according to an embodiment may generate a transformation coefficient of a residual sample of the luma block by performing transformation on the luma block. In other words, the residual samples of the luma block may be transformed by applying a transform kernel on the luma block, and accordingly, the luma transformation coefficients may be generated.

Also, the transformer 310 may generate a transformation coefficient of a residual sample of the chroma block by performing transformation on the chroma block. In other words, the residual samples of the chroma block may be transformed by applying a transform kernel on the chroma block, and accordingly, the chroma transformation coefficients may be generated.

Since sizes of the luma block and the chroma block are different, a transform kernel for inverse transformation of the luma block and a transform kernel for inverse transformation of the chroma block are different.

However, in the video encoding apparatus 300 according to an embodiment, a luma transform kernel for transformation of the luma block and a chroma transform kernel for transformation of the chroma block corresponding to the luma block may be linked and combined, and a combination of the luma transform kernel and the chroma transform kernel may be pre-determined.

The encoder 320 may generate a bin string by binarizing chroma multi-transform kernel information indicating whether the chroma transform kernel for inverse transformation of the chroma block is determined to be among a plurality of chroma transform kernels, and output a bit string generated by performing entropy decoding on the bin string of the chroma multi-transform kernel information.

When the transformer 310 used the luma transform kernel while determining the chroma transform kernel used for transformation of the chroma block, the encoder 320 may generate multi-transform kernel information indicating that the chroma transform kernel is determined to be among the plurality of chroma transform kernels. When the chroma transform kernel is determined to be a pre-set transform kernel according to a certain condition without using the luma transform kernel, and used for transformation of the chroma block, the encoder 320 may generate the multi-transform kernel information indicating that the chroma transform kernel is determined to be among the plurality of chroma transform kernels.

However, when the chroma transform kernel is used only as a fixed transform kernel, the encoder 320 may generate the multi-transform kernel information indicating that the chroma transform kernel is not determined to be among the plurality of chroma transform kernels.

According to a detailed embodiment, the multi-transform kernel information may be expressed in a value of 0 or 1, and when the chroma transform kernel is used only as a fixed transform kernel, the multi-transform kernel information may be set to 0, and when the chroma transform kernel is determined as a pre-set transform kernel according to a certain condition or according to the luma transformation block, the multi-transform kernel information may be set to 1.

The encoder 320 according to an embodiment may output the bit string generated by entropy-decoding the quantized transformation coefficient of the chroma block and the multi-transform kernel information.

Hereinafter, detailed operations of the video encoding apparatus 300 according to an embodiment performing multi-transformation of a chroma block are described with reference to FIG. 4.

Figure 4:
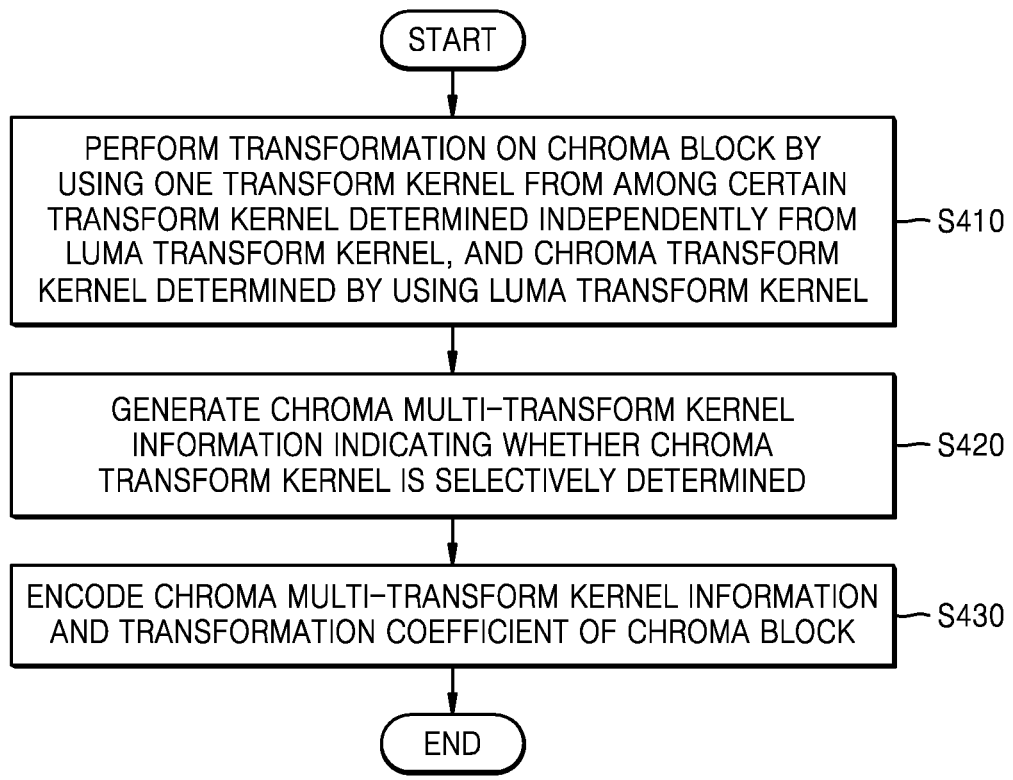
FIG. 4 is a flowchart of a video encoding method according to an embodiment.

FIG. 4 is a flowchart of a video encoding method according to an embodiment.

In operation S410, the video encoding apparatus 300 may perform transformation on a chroma block by using a chroma transform kernel determined by using a certain transform kernel determined independently from a luma transform kernel for transformation of a luma block, or a chroma transform kernel determined by using the luma transform kernel.

In operation S420, the video encoding apparatus 300 may generate chroma multi-transform kernel information indicating whether the chroma transform kernel is determined to be among a plurality of chroma transform kernels.

In operation S430, the video encoding apparatus 300 may encode and output the chroma multi-transform kernel information and a transformation coefficient generated by performing transformation on the chroma block.

The video encoding apparatus 300 may determine a chroma transform kernel for a chroma block to be among a plurality of chroma transform kernels, according to a prediction mode. According to a detailed embodiment, when an intra chroma transform kernel for a chroma block encoded in an intra prediction mode is determined to be among a plurality of chroma transform kernels, according to a certain condition, the video encoding apparatus 300 may generate intra chroma multi-transform kernel information indicating that the intra chroma transform kernel is determined to be among the plurality of chroma transform kernels. When an inter chroma transform kernel for a chroma block encoded in an inter prediction mode is determined to be among a plurality of chroma transform kernels, according to a certain condition, the video encoding apparatus 300 may generate inter chroma multi-transform kernel information indicating that the inter chroma transform kernel is determined to be among the plurality of chroma transform kernels.

When a luma transform kernel for transformation of a luma block is determined to be among a plurality of luma transform kernels, the video encoding apparatus 300 according to an embodiment may determine a chroma transform kernel to be among a plurality of chroma transform kernels according to the luma transform kernel. In this case, the video encoding apparatus 300 may encode luma multi-transform kernel information indicating whether the luma transform kernel is determined to be among the plurality of luma transform kernels. Accordingly, the video encoding apparatus 300 may encode the luma multi-transform kernel information indicating that the luma transform kernel is determined to be among the plurality of luma transform kernels, and also encode the chroma multi-transform kernel information indicating that the chroma transform kernel is determined to be among the plurality of chroma transform kernels.

In detail, the video encoding apparatus 300 according to an embodiment may generate luma vertical transform kernel information for determining a vertical transform kernel for transformation of a luma block in a vertical direction, and luma horizontal transform kernel information for determining a horizontal transform kernel for transformation in a horizontal direction. A chroma vertical transform kernel for transformation of a chroma block in the vertical direction may be determined according to the luma block vertical transform kernel. Similarly, a chroma horizontal transform kernel for transformation of the chroma block in the horizontal direction may be determined according to the luma block horizontal transform kernel.

The video encoding apparatus 300 according to an embodiment may determine a combination of the chroma vertical transform kernel and the chroma horizontal transform kernel, based on an intra prediction mode indicating an intra prediction direction, when the chroma block is encoded in the intra prediction mode.

The video encoding apparatus 300 according to a detailed embodiment may determine the chroma transform kernel according to the luma transform kernel for transformation of the luma block, when the luma transform kernel is determined to be among the plurality of luma transform kernels and a size of the chroma transformation block is larger than a certain size. When the size of the chroma transformation block is smaller than or equal to the certain size, and a size of a prediction block corresponding to the chroma transformation block is 2N×2N, the video encoding apparatus 300 may determine the chroma transform kernel according to the luma transform kernel. When the size of the chroma transformation block is smaller than or equal to the certain size, and the size of the prediction block corresponding to the chroma transformation block is not 2N×2N, the video encoding apparatus 300 may determine the chroma transform kernel pre-set independently from the luma transform kernel.

In this case, the video encoding apparatus 300 may encode the luma multi-transform kernel information indicating whether the luma transform kernel is determined to be among the plurality of luma transform kernels according to a certain condition, and encode the chroma multi-transform kernel information indicating that the chroma transform kernel is determined to be among the plurality of chroma transform kernels according to a certain condition.

However, when a fixed transform kernel is used to transform a chroma block regardless of a condition, chroma multi-transform kernel information indicating that the chroma transform kernel is not determined to be among the plurality of chroma transform kernels may be encoded.

According to an embodiment, the chroma multi-transform kernel information may be set individually per data unit, such as a block of a sequence, picture, slice, or coding unit.

For example, the video encoding apparatus 300 according to an embodiment may determine the chroma transform kernel to be among the plurality of chroma transform kernels for transformation of a current coding unit. In this case, the chroma multi-transform kernel information indicating whether the chroma transform kernel is determined to be among the plurality of chroma transform kernels may be encoded in a coding unit level. The chroma multi-transform kernel information may be included in a coding unit syntax for the current coding unit.

For example, the video encoding apparatus 300 according to an embodiment may determine the chroma transform kernel to be among the plurality of chroma transform kernels for transformation of a current slice. In this case, the chroma multi-transform kernel information indicating whether the chroma transform kernel is determined to be among the plurality of chroma transform kernels may be encoded in a slice level. The chroma multi-transform kernel information may be included in a slice header for the current slice.

For example, the video encoding apparatus 300 according to an embodiment may determine the chroma transform kernel to be among the plurality of chroma transform kernels for transformation of a current picture. In this case, the chroma multi-transform kernel information indicating whether the chroma transform kernel is determined to be among the plurality of chroma transform kernels may be encoded in a picture level. The chroma multi-transform kernel information may be included in PPS for the current picture.

For example, the video encoding apparatus 300 according to an embodiment may determine the chroma transform kernel to be among the plurality of chroma transform kernels for transformation of a current sequence. In this case, the chroma multi-transform kernel information indicating whether the chroma transform kernel is determined to be among the plurality of chroma transform kernels may be encoded in a sequence level. The chroma multi-transform kernel information may be included in SPS for the current sequence.

Accordingly, the video encoding apparatus 300 according to an embodiment may add the chroma multi-transform kernel information to at least one of the coding unit syntax, the slice header, the PPS, and the SPS, based on whether the chroma transform kernel is determined to be among the plurality of chroma transform kernels, per data unit, such as the sequence, picture, slice, or coding unit.

Figure 5:
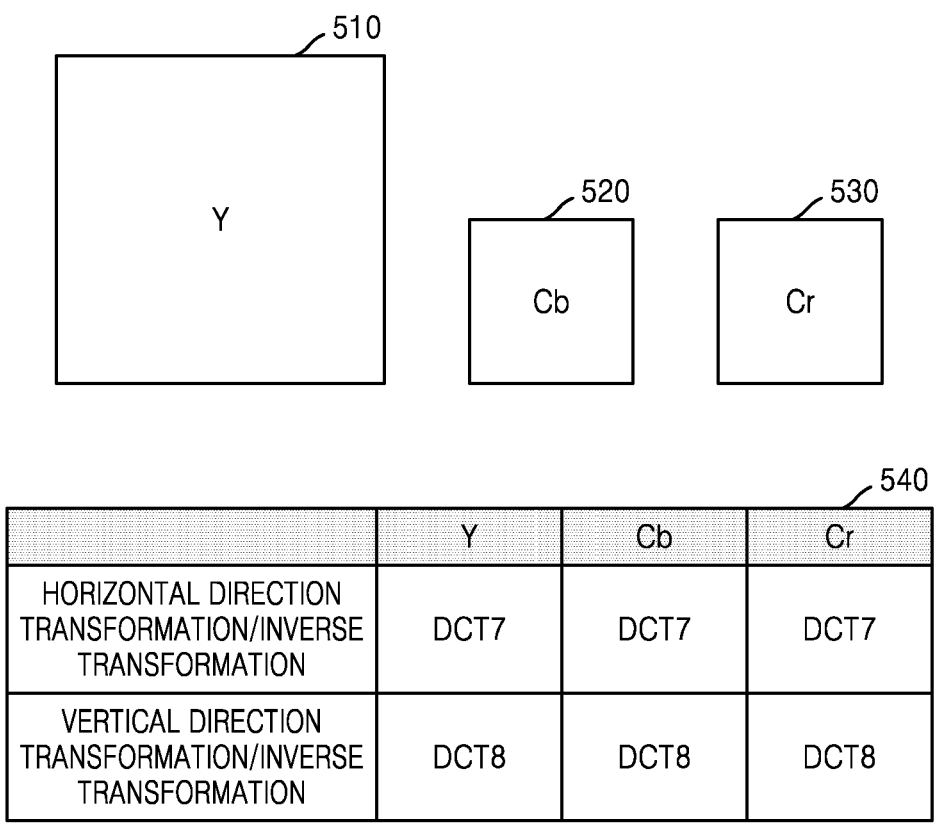
FIG. 5 illustrates a chroma transform kernel determined to be among a plurality of chroma transform kernels, according to a luma transform kernel determined to be among a plurality of luma transform kernels, according to an embodiment.

FIG. 5 illustrates a chroma transform kernel determined to be among a plurality of chroma transform kernels, according to a luma transform kernel determined to be among a plurality of luma transform kernels, according to an embodiment.

The video decoding apparatus 100 according to an embodiment may use a multi-transform technique as a technique of performing inverse transformation of a transformation block by using a transform kernel selected from various transform kernels. The various transform kernels selectable for the multi-transform technique may be defined according to types, and according to a certain video compression standard, transform kernels of each transform kernel type are pre-defined; thus transform kernel types are indicated as DCT1 through DCTn types and DST1 through DSTm types, wherein n and m are each an integer. A horizontal transform kernel and a vertical transform kernel of a luma transformation block, and a horizontal transform kernel and a vertical transform kernel of a chroma transformation block are defined for each of the DCTn type and the DST m type. Accordingly, a horizontal transform kernel of the DCT8 type may be selected for horizontal direction inverse transformation of a luma block, and a vertical transform kernel of the DST7 type may be selected for vertical direction inverse transformation of the luma block. In other words, a horizontal transform kernel and a vertical transform kernel may be individually selected.

According to an embodiment, the multi-transform technique may be used when a size of a luma transformation block is between 4×4 and 32×32.

The video decoding apparatus 100 according to an embodiment may also select a chroma transform kernel according to a luma transform kernel, when the luma transform kernel is used from among a plurality of luma transform kernels. According to a transform kernel matching table 540, when a horizontal transform kernel of the DCT7 type is selected for horizontal direction inverse transformation of a luma transformation block 510 and a vertical transform kernel of the DCT8 type is selected for vertical direction inverse transformation, a horizontal direction kernel of the DCT7 type may be selected for horizontal direction inverse transformation of a Cr transformation block 520 and a Cb transformation block 530, and a vertical direction kernel of the DCT8 type may be selected for vertical direction inverse transformation.

In other words, the video decoding apparatus 100 may perform inverse transformation by applying a luma horizontal transform kernel of the DCT7 type to the luma transformation block 510, and applying a luma vertical transform kernel of the DCT8 type. The video decoding apparatus 100 may perform, based on a transform kernel applied to the luma transformation block 510, inverse transformation by applying a chroma horizontal transform kernel of the DCT7 type to the Cr transformation block 520 and applying a chroma vertical transform kernel of the DCT8 type, and inverse transformation by applying the chroma horizontal transform kernel of the DCT7 type to the Cb transformation block 530 and the chroma vertical transform kernel of the DCT8 type.

The transform kernel matching table 540 of FIG. 5 shows that a chroma transform kernel for chroma transformation blocks 510 and 520 is also determined to be a same type as the luma transform kernel, as the luma transform kernel for the luma transformation block 510 is determined to be among a plurality of luma transform kernels. It should be noted that a multi-transform technique for a chroma transformation block suggested in the present disclosure is not limited to embodiments according to the transform kernel matching table 540.

The video decoding apparatus 100 according to an embodiment may consider a certain condition while a chroma transformation block is variably determined. When a certain condition is satisfied, a chroma transform kernel is also selected considering selection of a luma transform kernel, and when the certain condition is not satisfied, inverse transformation may be performed on a chroma block by using a certain transform kernel selected separately from a luma transform kernel.

For example, it may be determined whether a chroma transform kernel is determined to be a same type as a luma transform kernel, according to a size of a luma transformation block. For example, when the size of the luma transformation block is larger than a certain size, the chroma transform kernel of the same type as the luma transform kernel is selected, and when the size of the luma transformation block is smaller than or equal to the certain size, a certain transform kernel may be selected as the chroma transform kernel separately from the luma transform kernel.

As another example, it may be determined whether a chroma transform kernel is determined to be a same type as a luma transform kernel, according to a size of a chroma transformation block. For example, when the size of the chroma transformation block is larger than a certain size, the chroma transform kernel of the same type as the luma transform kernel is selected, and when the size of the chroma transformation block is smaller than or equal to the certain size, a certain transform kernel may be selected as the chroma transform kernel separately from the luma transform kernel.

As another example, when coded block flag (cdf) information for a luma transformation block is a certain value, a chroma transform kernel of a same type as a luma transform kernel is selected, and otherwise, a certain transform kernel may be selected as the chroma transform kernel separately from the luma transform kernel.

As another example, when cdf information for a chroma transformation block is a certain value, a chroma transform kernel of a same type as a luma transform kernel is selected, and otherwise, a certain transform kernel may be selected as the chroma transform kernel separately from the luma transform kernel.

As another example, when a luma transform kernel is selected variably for multi-transform, a chroma transform kernel of a same type as a luma transform kernel may be selected, and other wise, a chroma transform kernel may be selected to be a certain transform kernel separately from the luma transform kernel.

As another example, it may be determined whether a chroma transform kernel is determined to be a same type as a luma transform kernel, according to a size of a luma prediction block. For example, when the size of the luma prediction block is larger than a certain size, the chroma transform kernel of the same type as the luma transform kernel is selected, and when the size of the luma prediction block is smaller than or equal to the certain size, a certain transform kernel may be selected as the chroma transform kernel separately from the luma transform kernel.

As another example, it may be determined whether a chroma transform kernel is determined to be a same type as a luma transform kernel, according to a size of a chroma prediction block. For example, when the size of the chroma prediction block is larger than a certain size, the chroma transform kernel of the same type as the luma transform kernel is selected, and when the size of the chroma prediction block is smaller than or equal to the certain size, a certain transform kernel may be selected as the chroma transform kernel separately from the luma transform kernel.

As another example, when a syntax for secondary transformation is a certain value, a chroma transform kernel of a same type as a luma transform kernel may be selected, and other wise, a certain transform kernel may be selected as the chroma transform kernel separately from the luma transform kernel.

As another example, when a luma block is encoded in an intra prediction mode and a luma intra index indicating an intra prediction direction is a certain value, a chroma transform kernel of a same type as a luma transform kernel may be selected, and other wise, a certain transform kernel may be selected as the chroma transform kernel separately from the luma transform kernel.

As another example, when a chroma block is encoded in an intra prediction mode and a chroma intra index indicating an intra prediction direction is a certain value, a chroma transform kernel of a same type as a luma transform kernel may be selected, and other wise, a certain transform kernel may be selected as the chroma transform kernel separately from the luma transform kernel.

As another example, it may be determined whether a chroma transform kernel is determined to be a same type as a luma transform kernel, according to the number of significant coefficients of a luma transformation block. For example, when the significant coefficients of the luma transformation block are higher than a certain number, the chroma transform kernel of the same type as the luma transform kernel is selected, and otherwise, a certain transform kernel may be selected as the chroma transform kernel separately from the luma transform kernel.

As another example, it may be determined whether a chroma transform kernel is determined to be a same type as a luma transform kernel, according to the number of significant coefficients of a chroma transformation block. For example, when the significant coefficients of the chroma transformation block are higher than a certain number, the chroma transform kernel of the same type as the luma transform kernel is selected, and otherwise, a certain transform kernel may be selected as the chroma transform kernel separately from the luma transform kernel.

As another example, when a quantization parameter (QP) for scaling (inverse quantization) of a transformation coefficient is higher than a certain value, a chroma transform kernel of a same type as a luma transform kernel may be selected, and otherwise, a certain transform kernel may be selected as the chroma transform kernel separately from the luma transform kernel.

As another example, it may be determined whether a chroma transform kernel is determined to be a same type as a luma transform kernel, according to a shape of a luma coding block. For example, when the shape of the luma coding block is a square, the chroma transform kernel of the same type as the luma transform kernel is selected, and otherwise, a certain transform kernel may be selected as the chroma transform kernel separately from the luma transform kernel.

As another example, it may be determined whether a chroma transform kernel is determined to be a same type as a luma transform kernel, according to a shape of a chroma coding block. For example, when the shape of the chroma coding block is a square, the chroma transform kernel of the same type as the luma transform kernel is selected, and otherwise, a certain transform kernel may be selected as the chroma transform kernel separately from the luma transform kernel.

A chroma transform kernel of a same type as a luma transform kernel may be selected according to various conditions, in addition to conditions listed above, or alternatively, a certain transform kernel may be selected as the chroma transform kernel separately from the luma transform kernel.

The video decoding apparatus 100 according to an embodiment may determine whether to perform multi-transform on a chroma block in a slice level, a picture level, or a sequence level.

For example, when a luma multi-transform kernel information is obtained from a slice header, it is determined whether inverse transformation is to be performed on luma transformation blocks included in a current slice by applying a variable transform kernel, based on the luma multi-transform kernel information, and chroma multi-transform kernel information may be set to a same value as the luma multi-transform kernel information. It may be determined whether to perform inverse transformation on chroma transformation blocks included in the current slice by applying a variable transform kernel, based on the chroma multi-transform kernel information.

For example, when luma multi-transform kernel information is obtained from PPS, it is determined whether inverse transformation is to be performed on luma transformation blocks included in a current picture by applying a variable transform kernel, based on the luma multi-transform kernel information, and it may be determined whether to perform inverse transformation on chroma transformation blocks included in the current picture by applying a variable transform kernel, based on chroma multi-transform kernel information determined according to the luma multi-transform kernel information.

For example, when luma multi-transform kernel information is obtained from SPS, it is determined whether inverse transformation is to be performed on luma transformation blocks included in a current sequence by applying a variable transform kernel, based on the luma multi-transform kernel information, and it may be determined whether to perform inverse transformation on chroma transformation blocks included in the current sequence by applying a variable transform kernel, based on chroma multi-transform kernel information determined according to the luma multi-transform kernel information.

According to the embodiments, luma multi-transform kernel information and chroma multi-transform kernel information may each be a flag of 1 bit. In other words, when the luma multi-transform kernel information is 1, the video decoding apparatus 100 determines that a variable luma transform kernel is applied for inverse transformation of luma transformation blocks, and when the luma multi-transform kernel information is 0, the video decoding apparatus 100 may use a fixed luma transform kernel. Since the chroma multi-transform kernel information is determined to be a same value as the luma multi-transform kernel information, when the chroma multi-transform kernel information is 1, it is determined that a variable chroma transform kernel is applied for inverse transformation of chroma transformation blocks, and when the luma multi-transform kernel information is 0, a fixed chroma transform kernel may be used.

As another example, using of a multi-transform kernel may be determined according to prediction modes. In detail, luma intra multi-transform kernel information and luma inter multi-transform kernel information may be obtained in at least one of a slice level, a picture level, and a sequence level, and accordingly, chroma intra multi-transform kernel information and chroma inter multi-transform kernel information may be determined in at least one of a slice level, a picture level, and a sequence level.

For example, when luma intra multi-transform kernel information is obtained from a slice header, it may be determined whether inverse transformation is to be performed on luma transformation blocks decoded in an intra prediction mode included in a current slice by applying a variable transform kernel, based on the luma intra multi-transform kernel information. It may be determined whether to preform inverse transformation on chroma transformation blocks decoded in the intra prediction mode included in the current slice by applying a variable transform kernel, based on chroma intra multi-transform kernel information set according to the luma intra multi-transform kernel information.

Also, when luma inter multi-transform kernel information is obtained from a slice header, it may be determined whether inverse transformation is to be performed on luma transformation blocks decoded in an inter prediction mode included in a current slice by applying a variable transform kernel, based on the luma inter multi-transform kernel information. It may be determined whether to preform inverse transformation on chroma transformation blocks decoded in the inter prediction mode included in the current slice by applying a variable transform kernel, based on chroma inter multi-transform kernel information set according to the luma inter multi-transform kernel information.

For example, when luma intra multi-transform kernel information is obtained from PPS, it may be determined whether inverse transformation is to be performed on luma transformation blocks decoded in an intra prediction mode included in a current picture by applying a variable transform kernel, based on the luma intra multi-transform information. It may be determined whether to perform inverse transformation on chroma transformation blocks decoded in the intra prediction mode included in the current picture by applying a variable transform kernel, based on chroma intra multi-transform kernel information set according to the luma intra multi-transform kernel information.

Also, when luma inter multi-transform kernel information is obtained from PPS, it may be determined whether inverse transformation is to be performed on luma transformation blocks decoded in an inter prediction mode included in a current picture by applying a variable transform kernel, based on the luma inter multi-transform information. It may be determined whether to perform inverse transformation on chroma transformation blocks decoded in the inter prediction mode included in the current picture by applying a variable transform kernel, based on chroma inter multi-transform kernel information set according to the luma inter multi-transform kernel information.

For example, when luma intra multi-transform kernel information is obtained from SPS, it may be determined whether inverse transformation is to be performed on luma transformation blocks decoded in an intra prediction mode included in a current sequence by applying a variable transform kernel, based on the luma intra multi-transform information. It may be determined whether to perform inverse transformation on chroma transformation blocks decoded in the intra prediction mode included in the current sequence by applying a variable transform kernel, based on chroma intra multi-transform kernel information set according to the luma intra multi-transform kernel information.

Also, when luma inter multi-transform kernel information and chroma inter multi-transform kernel information are obtained from SPS, it may be determined whether inverse transformation is to be performed on luma transformation blocks decoded in an inter prediction mode included in a current sequence by applying a variable transform kernel, based on the luma inter multi-transform information. It may be determined whether to perform inverse transformation on chroma transformation blocks decoded in the inter prediction mode included in the current sequence by applying a variable transform kernel, based on the chroma inter multi-transform kernel information set according to the luma inter multi-transform kernel information.

As in the above example, the luma intra multi-transform kernel information, the luma inter multi-transform kernel information, the chroma intra multi-transform kernel information, and chroma inter multi-transform kernel information may be each set to a flag of 1 bit.

As another example, it may be determined whether a multi-transform technique is used in a coding block level. According to luma multi-transform kernel information for a current luma coding block, a multi-transform kernel may be applied for inverse transformation of the current luma coding block, or when the multi-transform kernel is not used, a transform kernel of the DCT2 type may be fixedly used for inverse transformation of the current luma coding block. When chroma multi-transform kernel information set according to the luma multi-transform kernel information indicates that a multi-transform kernel is used for inverse transformation of a chroma coding block, a chroma transform kernel of a same type as a type of a luma transform kernel may also be determined.

For example, when a value of luma multi-transform kernel information, i.e., a flag of 1 bit, is 1, a variable transform kernel may be applied to a luma transformation block of a current luma coding block, and accordingly, a variable transform kernel may also be applied to a chroma transformation block of a current chroma coding block. When a value of luma multi-transform kernel information, i.e., a flag of 2 bits, is 0, a luma horizontal/vertical transform kernel of the DCT2 type may be fixedly applied to a luma transformation block of a current luma coding block, and accordingly, a chroma horizontal/vertical transform kernel of the DCT2 type may also be applied to a chroma transformation block of a current chroma coding block.

As another example, when a multi-transform technique is used in a transformation block level, a horizontal transform kernel and a vertical transform kernel may each be determined to be among a plurality of transform kernels, according to multi-transform kernel information. A luma horizontal transform kernel and a luma vertical transform kernel may be selected for inverse transformation of a current luma transformation block, according to luma multi-transform kernel information for a current transformation block. When chroma multi-transform kernel information set according to the luma multi-transform kernel information indicates that a multi-transform kernel is used for inverse transformation of a chroma transformation block, a chroma horizontal/vertical transform kernel of a same type as a type of a luma horizontal/vertical transform kernel determined for a luma transformation block may be determined.

For example, in luma multi-transform kernel information, i.e., a flag of 2 bits for a current luma transformation block, a first bit may be a bit for selecting a horizontal transform kernel and a second bit may be a bit for selecting a vertical transform kernel. Regarding a transform kernel candidate, a set of two types of transform kernels is provided, and each bit indicates one of the two types.

For example, when a transform kernel candidate set {DCT7, DCT8} is provided and luma multi-transform kernel information is 00, a first bit 0 of the luma multi-transform kernel information indicates a transform kernel of a DCT7 type, i.e., a first factor in the transform kernel candidate set {DCT7, DCT8}, and a second bit 0 of the luma multi-transform kernel information also indicates a transform kernel of DCT7 type, i.e., the first factor in the transform kernel candidate set {DCT7, DCT8}. Accordingly, a luma horizontal transform kernel of the DCT7 type indicated by the first bit 0 of the luma multi-transform kernel information is selected as a luma horizontal transform kernel for a current luma transformation block, and a luma vertical transform kernel of the DCT7 type indicated by the second bit 0 of the luma multi-transform kernel information is selected as a luma vertical transform kernel for the current luma transformation block.

As another example, when luma multi-transform kernel information is 10, a first bit 1 of the luma multi-transform kernel information indicates a transform kernel of a DCT8 type, i.e., a second factor in a transform kernel candidate set {DCT7, DCT8}, and a second bit 0 of the luma multi-transform kernel information indicates a transform kernel of DCT7 type, i.e., a first factor in the transform kernel candidate set {DCT7, DCT8}. Accordingly, a luma horizontal transform kernel of the DCT8 type indicated by the first bit 1 of the luma multi-transform kernel information is selected as a luma horizontal transform kernel for a current luma transformation block, and a luma vertical transform kernel of the DCT7 type indicated by the second bit 0 of the luma multi-transform kernel information is selected as a luma vertical transform kernel for the current luma transformation block.

When a variable transform kernel is applied for a current luma transformation block, a variable transform kernel may also be applied to a current chroma transformation block. When a value of luma multi-transform kernel information, i.e., a 2-bit flag, is 00, chroma multi-transform kernel information may also be set to 00. Similarly, when a value of luma multi-transform kernel information, i.e., 2-bit flag, is 01, chroma multi-transform kernel information may also be set to 01, when a value of luma multi-transform kernel information is 10, chroma multi-transform kernel information may also be set to 10, and when a value of luma multi-transform kernel information is 11, chroma multi-transform kernel information may also be set to 11.

In other words, when a transform kernel candidate set {DCT7, DCT8} is provided and luma multi-transform kernel information is 01, a luma horizontal transform kernel of a DCT7 type and a luma vertical transform kernel of a DCT8 type may be selected according to the luma multi-transform kernel information. Since chroma multi-transform kernel information is also set to 01 according to the luma multi-transform kernel information, a chroma horizontal transform kernel of the DCT7 type and a chroma vertical transform kernel of the DCT8 type may be selected according to the chroma multi-transform kernel information.

FIG. 6 illustrates a table of combinations of horizontal transform kernel candidates and vertical transform kernel candidates, which change according to an intra prediction mode.

A transform kernel candidate set according to an embodiment may be pre-set according to a prediction mode.

For example, when a current coding block is decoded in an intra prediction mode, set 0: {DST7, DCT8}, set 1: {DST7, DST1}, and set 2: {DST7, DCT5} may be designated as transform kernel candidate sets for selecting a transformation block of the current coding block. A first factor and a second factor of a transform kernel candidate set respectively indicate a horizontal transform kernel and a vertical transform kernel.

According to the table of FIG. 6, an index indicating a horizontal transform kernel candidate and an index indicating a vertical transform kernel candidate are paired for each intra mode.

For example, when a current coding block is decoded according to an intra mode index 1, a horizontal transform kernel candidate index is 2 and a vertical transform kernel candidate index is also 2. Accordingly, as a horizontal transform kernel for inverse transformation of the current coding block, a horizontal transform kernel of a DST7 type, i.e., a first factor in set 2: {DST7, DCT5} indicated by the horizontal transform kernel candidate index, may be selected. As a vertical transform kernel for inverse transformation of the current coding block, a vertical transform kernel of a DST5 type, i.e., a second factor in set 2: {DST7, DCT5} indicated by the vertical transform kernel candidate index, may be selected.

For example, when a current coding block is decoded according to an intra mode index 9, a horizontal transform kernel candidate index is 2 and a vertical transform kernel candidate index is 0. Accordingly, as a horizontal transform kernel for inverse transformation of the current coding block, a horizontal transform kernel of a DST7 type, i.e., a first factor in set 2: {DST7, DCT5} indicated by the horizontal transform kernel candidate index, may be selected. As a vertical transform kernel for inverse transformation of the current coding block, a vertical transform kernel of a DST8 type, i.e., a second factor in set 0: {DST7, DCT8} indicated by the vertical transform kernel candidate index, may be selected.

The video decoding apparatus 100 according to an embodiment may variably determine a transformation kernel for a chroma block, based on a transform kernel determined according to an intra mode index in a luma block decoded in an intra prediction mode. A value equal to the intra mode index for the luma block may be used as an intra mode index for the chroma block. Alternatively, when the intra mode index for the chroma block is separately obtained, a chroma horizontal transform kernel and a chroma vertical transform kernel may be determined according to horizontal/vertical transform kernel candidates corresponding to a chroma intra mode index in the table of FIG. 6.

However, when the chroma intra mode index indicates an LM chroma mode or a DM chroma mode, a horizontal/vertical transform kernel candidate determined according to a luma intra mode index may be determined as a chroma horizontal/vertical transform kernel. As another example, when the chroma intra mode index indicates an LM chroma mode or a DM chroma mode, a horizontal/vertical transform kernel candidate in a planar mode (intra mode index 0) may be determined as a chroma horizontal/vertical transform kernel.

Hereinabove, a transform kernel candidate set pre-set for a coding block decoded in an intra prediction mode has been described. A transform kernel candidate set may also be pre-set for a coding block decoded in an inter prediction mode.

For example, a transform kernel candidate set for a luma coding block decoded in an inter prediction mode may be one, i.e., {DCT8, DCT7}. In this case, a transform kernel for a chroma coding block may also be determined from the transform kernel candidate set {DCT8, DCT7}.

As another example, a transform kernel candidate set for a luma coding block decoded in an inter prediction mode may be arbitrarily configured. In this case, a transform kernel for a chroma coding block may also be determined according to a luma transform kernel candidate set.

FIG. 7 illustrates syntax for determining an intra chroma block according to a luma multi-transform kernel, according to an embodiment.

The video decoding apparatus 100 may determine a transform kernel for a chroma transformation block decoded in an intra prediction mode, to be among a plurality of chroma transform kernels, according to syntax 710.

First, syntax 'Slice_Intra_Chroma_AMT' indicates whether a variable transform kernel is used for a chroma block decoded in an intra prediction mode in a current slice. Syntax 'Luma_Cbf' denotes that a luma block includes a transformation coefficient that is not 0. Syntax 'Chroma_TU_Size', i.e., whether a size of a chroma transformation block is larger than 4×4, is also considered as a condition. Syntax 'Partition', i.e., whether a prediction partition mode is 2N×2N is also considered as a condition.

Accordingly, a chroma transform kernel may be determined according to Case 1 in a table 720 when the variable transform kernel is used for the chroma block decoded in the intra prediction mode in the current slice because the syntax 'Slice_Intra_Chroma_AMT' is 1, the luma block includes the transformation coefficient that is not 0 because the syntax 'Luma_Cbf' is not 0, and the size of the chroma transformation block is larger than 4×4 according to the syntax 'Chroma_TU_Size'. In other words, when syntax 'Luma_ATM_CU' is 1, i.e., when a variable transform kernel is used for a luma coding block, a chroma horizontal transform kernel and a chroma vertical transform kernel for a current chroma block may be determined respectively to be kernels of same types as a luma horizontal transform kernel and luma vertical transform kernel. However, when a fixed transform kernel is used for the luma coding block, the chroma horizontal transform kernel and the chroma vertical transform kernel for the current chroma block may be determined respectively to a chroma horizontal transform kernel and a chroma vertical transform kernel of a DCT2 type.

A chroma horizontal/vertical transform kernel may also be determined according to Case 1 in the table 720 when the variable transform kernel is used for the chroma block decoded in the intra prediction mode in the current slice because the syntax 'Slice_Intra_Chroma_AMT' is 1, the luma block includes the transformation coefficient that is not 0 because the syntax 'Luma_Cbf' is not 0, the size of the chroma transformation block is smaller than or equal to 4×4 according to the syntax 'Chroma_TU_Size', but a partition mode is 2N×2N. A method of determining a transform kernel according to Case 1 has been described above, and thus details are not provided again.

A chroma horizontal/vertical transform kernel may also be determined according to Case 2 in the table 720 when the variable transform kernel is used for the chroma block decoded in the intra prediction mode in the current slice because the syntax 'Slice_Intra_Chroma_AMT' is 1, the luma block includes the transformation coefficient that is not 0 because the syntax 'Luma_Cbf' is not 0, the size of the chroma transformation block is smaller than or equal to 4×4 according to the syntax 'Chroma_TU_Size', and a partition mode is also not 2N×2N. In other words, when a variable transform kernel is used for the luma coding block (Luma_ATM_CU=1), the chroma horizontal transform kernel and the chroma vertical transform kernel for the current chroma block may be determined respectively to be a chroma horizontal transform kernel and a chroma vertical transform kernel of a DST7 type. This is the same as a horizontal/vertical transform kernel determined according to a transform kernel candidate set when a luma intra mode index is 15. However, when a fixed transform kernel is used for the luma coding block, the chroma horizontal transform kernel and the chroma vertical transform kernel for the current chroma block may be determined respectively to the chroma horizontal transform kernel and the chroma vertical transform kernel of the DCT2 type.

A chroma horizontal/vertical transform kernel may also be determined according to Case 3 in the table 720 when the variable transform kernel is used for the chroma block decoded in the intra prediction mode in the current slice because the syntax 'Slice_Intra_Chroma_AMT' is 1, and the luma block does not include the transformation coefficient that is not 0 because the syntax 'Luma_Cbf' is 0. Accordingly, the chroma horizontal transform kernel and the chroma vertical transform kernel for the current chroma block may be determined respectively to the chroma horizontal transform kernel and the chroma vertical transform kernel of the DCT2 type.

Lastly, the chroma horizontal/vertical transform kernels may be respectively determined to the chroma horizontal transform kernel and the chroma vertical transform kernel of the DCT2 type according to Case 3 in the table 720, even when a variable transform kernel is not used for the chroma block decoded in the intra prediction mode in the current slice because the syntax 'Slice_Intra_Chroma_AMT' is 0.

FIG. 8 illustrates syntax for determining an inter chroma block according to a luma multi-transform kernel, according to an embodiment.

The video decoding apparatus 100 may determine a transform kernel for a chroma transformation block decoded in an inter prediction mode, to be among a plurality of chroma transform kernels, according to syntax 810. First, syntax 'Slice_Inter_Chroma_AMT' indicates whether a variable transform kernel is used for a chroma block decoded in an inter prediction mode in a current slice.

Accordingly, a chroma transform kernel may be determined according to Case 1 in a table 820 when a variable transform kernel is used for the chroma block decoded in the inter prediction mode in the current slice because the syntax 'Slice_Inter_Chroma_AMT' is 1, a luma block includes a transformation coefficient that is not 0 because syntax 'Luma_Cbf' is not 0, and the size of the chroma transformation block is larger than 4×4 according to the syntax 'Chroma_TU_Size'. In other words, when syntax 'Luma_ATM_CU' is 1, i.e., when a variable transform kernel is used for a luma coding block, a chroma horizontal transform kernel and a chroma vertical transform kernel for a current chroma block may be determined respectively to be kernels of same types as a luma horizontal transform kernel and luma vertical transform kernel. However, when a fixed transform kernel is used for the luma coding block, the chroma horizontal transform kernel and the chroma vertical transform kernel for the current chroma block may be determined respectively to a chroma horizontal transform kernel and a chroma vertical transform kernel of a DCT2 type.

A chroma horizontal/vertical transform kernel may be determined according to Case 2 in the table 820 when the variable transform kernel is used for the chroma block decoded in the inter prediction mode in the current slice because the syntax 'Slice_Inter_Chroma_AMT' is 1, the luma block includes the transformation coefficient that is not 0 because the syntax 'Luma_Cbf' is not 0, and the size of the chroma transformation block is smaller than or equal to 4×4 according to the syntax 'Chroma_TU_Size'. In other words, when a variable transform kernel is used for the luma coding block (Luma_ATM_CU=1), the chroma horizontal transform kernel and the chroma vertical transform kernel for the current chroma block may be determined respectively to be a chroma horizontal transform kernel and a chroma vertical transform kernel of a DST7 type. However, when a fixed transform kernel is used for the luma coding block, the chroma horizontal transform kernel and the chroma vertical transform kernel for the current chroma block may be determined respectively to the chroma horizontal transform kernel and the chroma vertical transform kernel of the DCT2 type.

A chroma horizontal/vertical transform kernel may also be determined according to Case 3 in the table 820 when the variable transform kernel is used for the chroma block decoded in the inter prediction mode in the current slice because the syntax 'Slice_Inter_Chroma_AMT' is 1, and the luma block does not include the transformation coefficient that is not 0 because the syntax 'Luma_Cbf' is 0. Accordingly, the chroma horizontal transform kernel and the chroma vertical transform kernel for the current chroma block may be determined respectively to the chroma horizontal transform kernel and the chroma vertical transform kernel of the DCT2 type.

Lastly, the chroma horizontal/vertical transform kernels may be respectively determined to the chroma horizontal transform kernel and the chroma vertical transform kernel of the DCT2 type according to Case 3 in the table 820, even when a variable transform kernel is not used for the chroma block decoded in the inter prediction mode in the current slice because the syntax 'Slice_Inter_Chroma_AMT' is 0.

Hereinabove, embodiments of determining a chroma transform kernel by using luma multi-transform kernel information, a luma transform kernel type, or a luma transform kernel candidate set. Accordingly, the video encoding apparatus 300 may encode and record, in SPS, PPS, a slice header, a coding unit syntax, or a transform unit syntax, the luma multi-transform kernel information indicating whether a luma transform kernel is variably determined. Also, the video encoding apparatus 300 may set chroma transform kernel information indicating whether a chroma transform kernel is variably determined, based on whether a luma transform kernel is variably determined, and use the chroma transform kernel to transform a chroma transformation block.

The video decoding apparatus 100 according to an embodiment may parse the luma multi-transform kernel information from the SPS, PPS, slice header, coding unit syntax, or transform unit syntax, and determine whether the luma transform kernel is variably determined based on the luma multi-transform kernel information. It is determined whether the chroma transform kernel is variably determined by using chroma multi-transform kernel information determined based on the luma multi-transform kernel information. In other words, when the luma transform kernel is variably determined, the video decoding apparatus 100 may also variably determine the chroma transform kernel based on the luma transform kernel, and perform inverse transformation on the chroma transformation block by applying the chroma transform kernel.

Hereinafter, embodiments of determining and using chroma multi-transform kernel information, a chroma transform kernel type, or a chroma transform kernel candidate set independently from luma multi-transform kernel information, a luma transform kernel type, or a luma transform kernel candidate set are described.

Figure 9:
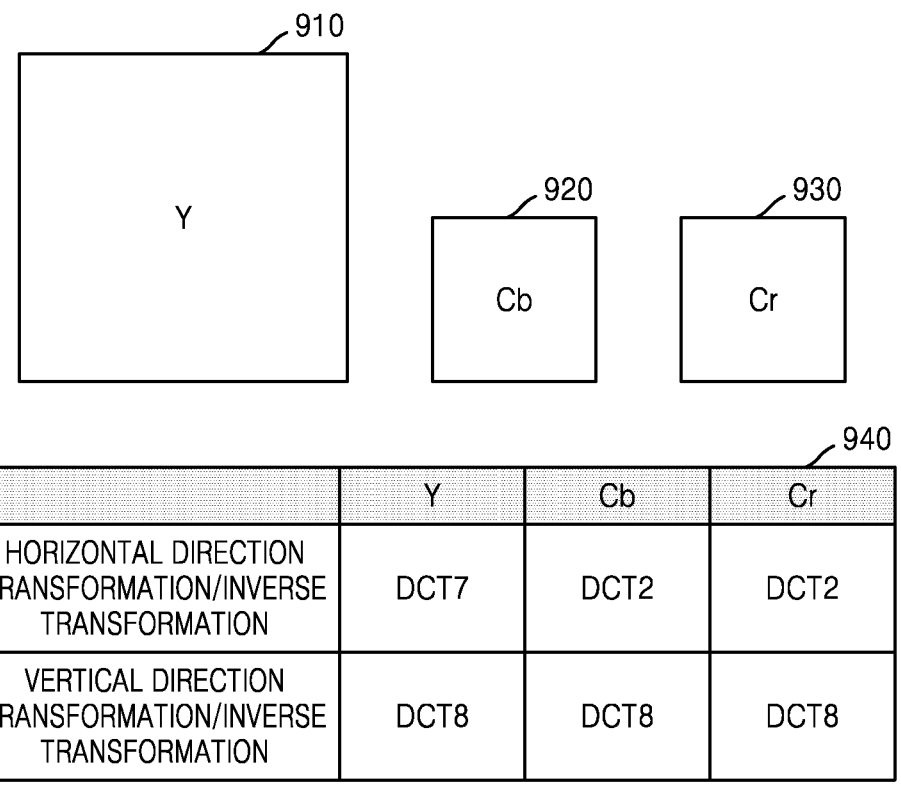
FIG. 9 illustrates a chroma transform kernel determined to be among a plurality of chroma transform kernels independently from a luma transform kernel determined to be among a plurality of luma transform kernels, according to an embodiment.

FIG. 9 illustrates a chroma transform kernel determined to be among a plurality of chroma transform kernels independently from a luma transform kernel determined to be among a plurality of luma transform kernels, according to an embodiment.

The video decoding apparatus 100 according to an embodiment may individually determine whether a luma transform kernel is used from among a plurality of luma transform kernels, and whether a chroma transform kernel is used from among a plurality of chroma transform kernels. According to a transform kernel matching table 940, when a horizontal transform kernel of a DCT7 type is selected for horizontal direction inverse transformation of a luma transformation block 910 and a vertical transform kernel of a DCT8 type is selected for vertical direction inverse transformation, a horizontal direction kernel of a DCT2 type may be selected for horizontal direction inverse transformation of a Cr transformation block 920 and a Cb transformation block 930, and a vertical direction kernel of the DCT8 type may be selected for vertical direction inverse transformation.

In other words, the video decoding apparatus 100 may perform inverse transformation by applying a luma horizontal transform kernel of a DCT7 type to the luma transformation block 910, and applying a luma vertical transform kernel of a DCT8 type. On the other hand, the video decoding apparatus 100 may perform inverse transformation by applying a chroma horizontal transform kernel of a DCT2 type to the Cr transformation block 920 and applying a chroma vertical transform kernel of a DCT8 type, and perform inverse transformation by applying the chroma horizontal transform kernel of the DCT2 type to the Cb transformation block 930 and the chroma vertical transform kernel of the DCT8 type, independently from a transform kernel applied to the luma transformation block 910.

The transform kernel matching table 940 of FIG. 9 illustrates that a chroma transform kernel for chroma transformation blocks 910 and 920 is determined to be among a plurality of chroma transform kernels, independently from a luma transform kernel for the luma transformation block 910 determined to be among a plurality of luma transform kernels. It should be noted that a multi-transform technique for a chroma transformation block suggested in the present disclosure is not limited to embodiments according to the transform kernel matching table 940.

The video decoding apparatus 100 according to an embodiment may consider a certain condition while a chroma transformation block is variably determined. When a certain condition is satisfied, inverse transformation may be performed on a chroma block by using a certain transform kernel determined to be among a plurality of chroma transform kernels. Here, a transform kernel determined to be among a plurality of chroma transform kernels or a pre-set fixed transform kernel may be determined independently from a luma transform kernel.

For example, it may be determined whether a chroma transform kernel is variably determined, according to a size of a luma transformation block. For example, when the size of the luma transformation block is larger than a certain size, the chroma transform kernel may be variably selected, and when the size of the luma transformation block is smaller than or equal to the certain size, a fixed transform kernel may be selected as the chroma transform kernel.

As another example, it may be determined whether a chroma transform kernel is variably determined, according to a size of a chroma transformation block. For example, when the size of the chroma transformation block is larger than a certain size, the chroma transform kernel may be variably selected, and when the size of the chroma transformation block is smaller than or equal to the certain size, a fixed transform kernel may be selected as the chroma transform kernel.

As another example, when cdf information for a luma transformation block is a certain value, a chroma transform kernel may be variably selected, and when the cbf is not the certain value, a fixed transform kernel may be selected as the chroma transform kernel.

As another example, when cdf information for a chroma transformation block is a certain value, a chroma transform kernel may be variably selected, and when not, a fixed transform kernel may be selected as the chroma transform kernel.

As another example, when a luma transform kernel is selected variably for multi-transform, a chroma transform kernel may be variably selected, and when the luma transform kernel is fixed, a chroma transform kernel may be selected to be a fixed transform kernel separately from the luma transform kernel.

As another example, it may be determined whether a chroma transform kernel is variably determined, according to a size of a luma prediction block. For example, when the size of the luma prediction block is larger than a certain size, the chroma transform kernel may be variably selected, and when the size of the luma prediction block is smaller than or equal to the certain size, a fixed transform kernel may be selected as the chroma transform kernel.

As another example, it may be determined whether a chroma transform kernel is determined to be among a plurality of chroma transform kernels, according to a size of a chroma prediction block. For example, when the size of the chroma prediction block is larger than a certain size, the chroma transform kernel may be variably selected, and when the size of the chroma prediction block is smaller than or equal to the certain size, a fixed transform kernel may be selected as the chroma transform kernel.

As another example, when a syntax for secondary transformation is a certain value, a chroma transform kernel may be variably selected, and when not, a fixed transform kernel may be selected as the chroma transform kernel.

As another example, when a luma block is encoded in an intra prediction mode and a luma intra index indicating an intra prediction direction is a certain value, a chroma transform kernel may be variably selected, and when not, a fixed transform kernel may be selected as the chroma transform kernel.

As another example, when a chroma block is encoded in an intra prediction mode and a chroma intra index indicating an intra prediction direction is a certain value, a chroma transform kernel may be variably selected, and when not, a fixed transform kernel may be selected as the chroma transform kernel.

As another example, it may be determined whether a chroma transform kernel is determined to be among a plurality of chroma transform kernels, according to the number of significant coefficients of a luma transformation block. For example, when the significant coefficients of the luma transformation block are higher than a certain number, the chroma transform kernel may be variably selected, and when the significant coefficients are lower than or equal to the certain value, a fixed transform kernel may be selected as the chroma transform kernel.

As another example, it may be determined whether a chroma transform kernel is variably determined, according to the number of significant coefficients of a chroma transformation block. For example, when the significant coefficients of the chroma transformation block are higher than a certain number, the chroma transform kernel may be variably selected, and when lower than or equal to the certain value, a fixed transform kernel may be selected as the chroma transform kernel.

As another example, when a quantization parameter QP for scaling (quantization) of a transformation coefficient is higher than a certain value, a chroma transform kernel may be variably selected, and when the QP is lower than or equal to the certain value, a fixed transform kernel may be selected as the chroma transform kernel.

As another example, it may be determined whether a chroma transform kernel is variably determined, according to a shape of a luma coding block. For example, when the shape of the luma coding block is a square, the chroma transform kernel may be variably selected, and when not, a fixed transform kernel may be selected as the chroma transform kernel.

As another example, it may be determined whether a chroma transform kernel is variably determined, according to a shape of a chroma coding block. For example, when the shape of the chroma coding block is a square, the chroma transform kernel may be variably selected, and when not, a fixed transform kernel may be selected as the chroma transform kernel.

A chroma transform kernel may be variably selected or a fixed transform kernel may be selected independently from a luma transform kernel, according to various conditions, in addition to conditions listed above.

The video decoding apparatus 100 according to an embodiment may determine whether to perform multi-transform on a luma block and a chroma block in a slice level, a picture level, or a sequence level.

For example, when a luma multi-transform kernel information and a chroma multi-transform kernel information are each obtained from a slice header, it is determined whether inverse transformation is to be performed on luma transformation blocks included in a current slice by applying a variable transform kernel, based on the luma multi-transform kernel information, and whether inverse transformation is to be performed on chroma transformation blocks included in the current slice by applying a variable transform kernel, based on the chroma multi-transform kernel information.

For example, when luma multi-transform kernel information and chroma multi-transform kernel information are each obtained from PPS, it is determined whether inverse transformation is to be performed on luma transformation blocks included in a current picture by applying a variable transform kernel, based on the luma multi-transform kernel information, and it may be determined whether inverse transformation is to be performed on chroma transformation blocks included in the current picture by applying a variable transform kernel, based on the chroma multi-transform kernel information.

For example, when luma multi-transform kernel information and chroma multi-transform kernel information are each obtained from SPS, it is determined whether inverse transformation is to be performed on luma transformation blocks included in a current sequence by applying a variable transform kernel, based on the luma multi-transform kernel information, and it may be determined whether inverse transformation is to be performed on chroma transformation blocks included in the current sequence by applying a variable transform kernel, based on the chroma multi-transform kernel information.

According to the embodiments, luma multi-transform kernel information and chroma multi-transform kernel information may each be a flag of 1 bit. In other words, when the luma multi-transform kernel information is 1, the video decoding apparatus 100 determines that a variable luma transform kernel is applied for inverse transformation of luma transformation blocks, and when the luma multi-transform kernel information is 0, the video decoding apparatus 100 may use a fixed luma transform kernel. When the chroma multi-transform kernel information is 1, it is determined that a variable chroma transform kernel is applied for inverse transformation of chroma transformation blocks, and when the chroma multi-transform kernel information is 0, a fixed chroma transform kernel may be used.

As another example, using of a multi-transform kernel may be determined according to prediction modes. In detail, luma intra multi-transform kernel information, luma inter multi-transform kernel information, chroma intra multi-transform kernel information, and chroma inter multi-transform kernel information may each be obtained in at least one of a slice level, a picture level, and a sequence level.

For example, when luma intra multi-transform kernel information and chroma intra multi-transform kernel information are each obtained from a slice header, it may be determined whether inverse transformation is to be performed on luma transformation blocks decoded in an intra prediction mode included in a current slice by applying a variable transform kernel, based on the luma intra multi-transform kernel information, and it may be determined whether inverse transformation is to be performed on chroma transformation blocks decoded in the intra prediction mode included in the current slice by applying a variable transform kernel, based on the chroma intra multi-transform kernel information.

Also, when luma inter multi-transform kernel information and chroma inter multi-transform kernel information are each obtained from a slice header, it may be determined whether inverse transformation is to be performed on luma transformation blocks decoded in an inter prediction mode included in a current slice by applying a variable transform kernel, based on the luma inter multi-transform kernel information, and it may be determined whether inverse transformation is to be performed on chroma transformation blocks decoded in the inter prediction mode included in the current slice by applying a variable transform kernel, based on the chroma inter multi-transform kernel information.

For example, when luma intra multi-transform kernel information and chroma intra multi-transform kernel information are each obtained from PPS, it may be determined whether inverse transformation is to be performed on luma transformation blocks decoded in an intra prediction mode included in a current picture by applying a variable transform kernel, based on the luma intra multi-transform information, and it may be determined whether inverse transformation is to be performed on chroma transformation blocks decoded in the intra prediction mode included in the current picture by applying a variable transform kernel, based on the chroma intra multi-transform kernel information.

Also, when luma inter multi-transform kernel information and chroma inter multi-transform kernel information are each obtained from PPS, it may be determined whether inverse transformation is to be performed on luma transformation blocks decoded in an inter prediction mode included in a current picture by applying a variable transform kernel, based on the luma inter multi-transform information, and it may be determined whether inverse transformation is to be performed on chroma transformation blocks decoded in the inter prediction mode included in the current picture by applying a variable transform kernel, based on the chroma inter multi-transform kernel information.

For example, when luma intra multi-transform kernel information and chroma intra multi-transform kernel information are each obtained from SPS, it may be determined whether inverse transformation is to be performed on luma transformation blocks decoded in an intra prediction mode included in a current sequence by applying a variable transform kernel, based on the luma intra multi-transform information, and it may be determined whether inverse transformation is to be performed on chroma transformation blocks decoded in the intra prediction mode included in the current sequence by applying a variable transform kernel, based on the chroma intra multi-transform kernel information.

Also, when luma inter multi-transform kernel information and chroma inter multi-transform kernel information are each obtained from SPS, it may be determined whether inverse transformation is to be performed on luma transformation blocks decoded in an inter prediction mode included in a current sequence by applying a variable transform kernel, based on the luma inter multi-transform information, and it may be determined whether inverse transformation is to be performed on chroma transformation blocks decoded in the inter prediction mode included in the current sequence by applying a variable transform kernel, based on the chroma inter multi-transform kernel information.

As in the above example, the luma intra multi-transform kernel information, the luma inter multi-transform kernel information, the chroma intra multi-transform kernel information, and chroma inter multi-transform kernel information may be each set to a flag of 1 bit.

As another example, it may be determined whether a multi-transform technique is used in a coding block level. According to chroma multi-transform kernel information for a current chroma coding block, a multi-transform kernel may be applied for inverse transformation of the current chroma coding block, or when the multi-transform kernel is not used, a chroma transform kernel of a DCT2 type may be fixedly used for inverse transformation of the current chroma coding block.

For example, when a value of chroma multi-transform kernel information, i.e., a flag of 1 bit, is 1, a variable transform kernel may be applied to a transformation block of a current chroma coding block, and may be determined independently from a transform kernel for transformation block of a luma coding block. When a value of chroma multi-transform kernel information, i.e., a flag of 2 bits, is 0, a chroma horizontal/vertical transform kernel of the DCT2 type may be fixedly applied to a transformation block of a current chroma coding block.

As another example, when a multi-transform technique is used in a transformation block level, a horizontal transform kernel and a vertical transform kernel may each be determined to be among a plurality of transform kernels, according to multi-transform kernel information. A luma horizontal transform kernel and a luma vertical transform kernel may be selected for inverse transformation of a current luma transformation block, according to luma multi-transform kernel information for a current transformation block. When chroma multi-transform kernel information indicates that a multi-transform kernel is used for inverse transformation of a chroma transformation block, a chroma horizontal transform kernel and a chroma vertical transform kernel may be determined to be among one of a plurality of chroma transform kernels for inverse transformation of a chroma transformation block.

For example, a first bit of chroma multi-transform kernel information, i.e., a 2-bit flag, may be a bit for selecting a horizontal transform kernel and a second bit may be a bit for selecting a vertical transform kernel. Regarding a transform kernel candidate, a set of two types of transform kernels is provided, and each bit indicates one of the two types. For example, when a transform kernel candidate set {DCT7, DCT8} is provided and chroma multi-transform kernel information is 00, a first bit 0 of the chroma multi-transform kernel information indicates a transform kernel of a DCT7 type, i.e., a first factor in the transform kernel candidate set {DCT7, DCT8}, and a second bit 0 of the chroma multi-transform kernel information also indicates a transform kernel of DCT7 type, i.e., the first factor in the transform kernel candidate set {DCT7, DCT8}. Accordingly, a chroma horizontal transform kernel of the DCT7 type indicated by the first bit 0 of the chroma multi-transform kernel information is selected as a chroma horizontal transform kernel for a current chroma transformation block, and a chroma vertical transform kernel of the DCT7 type indicated by the second bit 0 of the chroma multi-transform kernel information is selected as a chroma vertical transform kernel for the current chroma transformation block.

According to an embodiment, a transform kernel candidate set for chroma multi-transform may be pre-set according to a prediction mode. The table of FIG. 6 may be used for combinations of chroma horizontal transform kernel candidates and chroma vertical transform kernel candidates, which are changed according to a chroma intra prediction mode. However, it should be noted that a combination table of a horizontal transform kernel candidate and a vertical transform kernel candidate for selecting a luma multi-transform kernel, which are changed according to an intra prediction mode, and a combination table for selecting a chroma multi-transform kernel may be different. Here, the table of FIG. 6 is referred to again for convenience of description.

For example, when a current chroma coding block is decoded in an intra prediction mode, set 0: {DST7, DCT8}, set 1: {DST7, DST1}, and set 2: {DST7, DCT5} may be designated as transform kernel candidate sets. A first factor and a second factor of a transform kernel candidate set respectively indicate a horizontal transform kernel and a vertical transform kernel.

According to the table of FIG. 6, when decoding is performed according to a chroma intra mode index 1, a horizontal transform kernel candidate index is 2 and a vertical transform kernel candidate index is also 2. Accordingly, as a horizontal transform kernel for inverse transformation of a current chroma coding block, a chroma horizontal transform kernel of a DST7 type, i.e., a first factor in set 2: {DST7, DCT5} indicated by the horizontal transform kernel candidate index, may be selected. As a vertical transform kernel for inverse transformation of the current coding block, a chroma vertical transform kernel of a DST5 type, i.e., a second factor in set 2: {DST7, DCT5} indicated by the vertical transform kernel candidate index, may be selected.

For example, when decoding is performed according to a chroma intra mode index 9, a horizontal transform kernel candidate index is 2 and a vertical transform kernel candidate index is 0. Accordingly, as a chroma horizontal transform kernel and a vertical transform kernel, a chroma horizontal transform kernel of a DST7 type and a chroma vertical transform kernel of a DST8 type may be respectively selected.

However, when the chroma intra mode index indicates an LM chroma mode or a DM chroma mode, a horizontal/vertical transform kernel candidate determined according to a luma intra mode index may be determined as a chroma horizontal/vertical transform kernel. As another example, when the chroma intra mode index indicates an LM chroma mode or a DM chroma mode, a horizontal/vertical transform kernel candidate in a planar mode (intra mode index 0) may be determined as a chroma horizontal/vertical transform kernel.

Hereinabove, a transform kernel candidate set pre-set for a coding block decoded in an intra prediction mode has been described. A transform kernel candidate set may also be pre-set for a chroma coding block decoded in an inter prediction mode.

For example, a transform kernel candidate set for a chroma coding block decoded in an inter prediction mode may be one, i.e., {DCT8, DCT7}. In this case, a chroma transform kernel may be determined from the transform kernel candidate set {DCT8, DCT7}.

As another example, a transform kernel candidate set for a chroma coding block decoded in an inter prediction mode may be arbitrarily configured. In this case, a chroma transform kernel may be selected from a chroma transform kernel candidate set, and a luma transform kernel may be selected from a luma transform kernel candidate set.

Regarding operations performed by the video decoding apparatus 100 and operations performed by the video encoding apparatus 300 described above with reference to FIGS. 1 through 9, a block may be a data unit of a coding unit, a sub-block of a coding unit, or a largest coding unit. For example, a sub-block may be a prediction unit, i.e., a block determined by splitting a coding unit to perform prediction on the coding unit, a transformation unit determined by splitting a coding unit to perform transformation and quantization on the coding unit, or the like.

Hereinafter, a method of determining a data unit of an image, according to an embodiment is described with reference to FIGS. 10 through 23.

Figure 10:
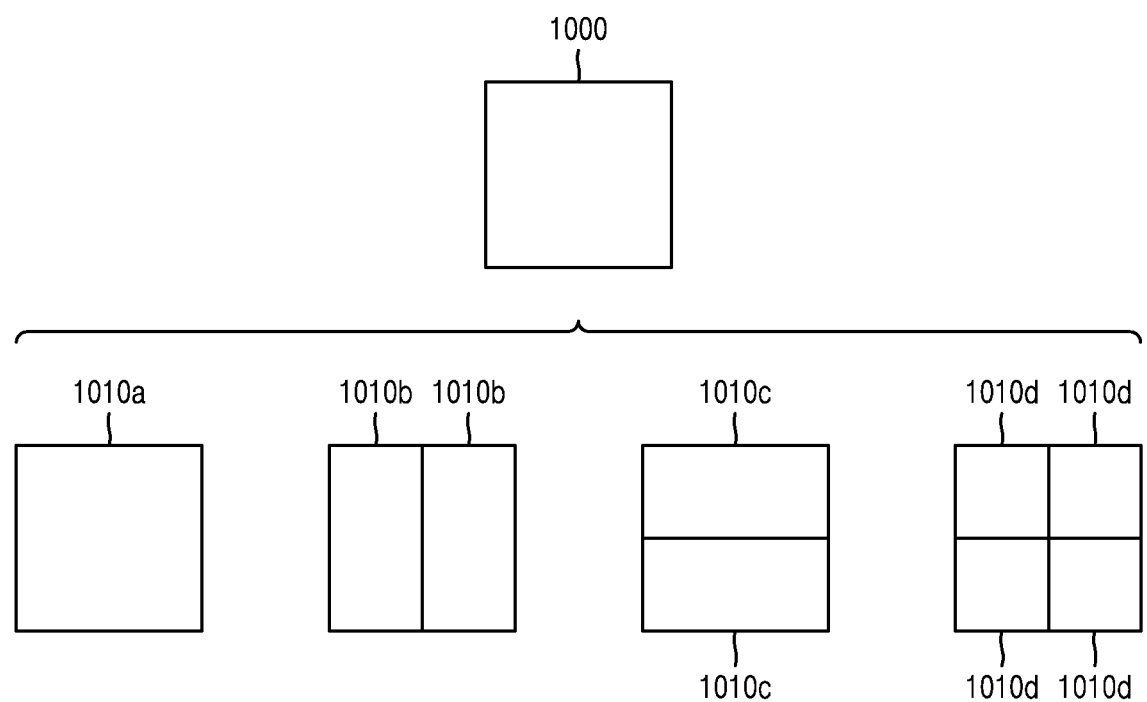
FIG. 10 illustrates processes of determining at least one coding unit as a current coding unit is split, according to an embodiment.

FIG. 10 illustrates processes of determining at least one coding unit as the video decoding apparatus 100 splits a current coding unit, according to an embodiment.

According to an embodiment, the video decoding apparatus 100 may determine a shape of a coding unit by using block shape information, and determine a shape into which a coding unit is split by using split shape information. In other words, a split method of a coding unit, which is indicated by the split shape information, may be determined based on a block shape indicated by the block shape information used by the video decoding apparatus 100.

According to an embodiment, the video decoding apparatus 100 may use block shape information indicating that a current coding unit has a square shape. For example, the video decoding apparatus 100 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, a decoder 1030 may not split a coding unit 1010a having the same size as the current coding unit 1000 according to split shape information indicating non-split, or determine coding units 1010b, 1010c, or 1010d based on split shape information indicating a certain split method.

Referring to FIG. 10, the video decoding apparatus 100 may determine two coding units 1010b by splitting the current coding unit 1000 in a vertical direction based on split shape information indicating a split in a vertical direction, according to an embodiment. The video decoding apparatus 100 may determine two coding units 1010c by splitting the current coding unit 1000 in a horizontal direction based on split shape information indicating a split in a horizontal direction. The video decoding apparatus 100 may determine four coding units 1010d by splitting the current coding unit 1000 in vertical and horizontal directions based on split shape information indicating splitting in vertical and horizontal directions. However, a split shape into which a square coding unit may be split is not limited to the above shapes, and may include any shape indicatable by split shape information. Certain split shapes into which a square coding unit are split will now be described in detail through various embodiments.

FIG. 11 illustrates processes of determining at least one coding unit when the video decoding apparatus 100 splits a coding unit having a non-square shape, according to an embodiment.

According to an embodiment, the video decoding apparatus 100 may use block shape information indicating that a current coding unit has a non-square shape. The video decoding apparatus 100 may determine, according to split shape information, whether to not split the non-square current coding unit or to split the non-square current coding unit via a certain method. Referring to FIG. 11, when block shape information of a current coding unit 1100 or 1150 indicates a non-square shape, the video decoding apparatus 100 may not split coding units 1110 or 1160 having the same size as the current coding unit 1100 or 1150 according to split shape information indicating non-split, or determine coding units 1120a, 1120b, 1130a, 1130b, 1130c, 1170a, 1170b, 1180a, 1180b, and 1180c based on split shape information indicating a certain split method. A certain split method of splitting a non-square coding unit will now be described in detail through various embodiments.

According to an embodiment, the video decoding apparatus 100 may determine a shape into which a coding unit is split by using split shape information, and in this case, the split shape information may indicate the number of at least one coding unit generated as the coding unit is split. Referring to FIG. 11, when split shape information indicates that the current coding unit 1100 or 1150 is split into two coding units, the video decoding apparatus 100 may determine two coding units 1120a and 1120b or 1170a and 1170b included in the current coding unit 1100 or 1150 by splitting the current coding unit 1100 or 1150 based on the split shape information.

According to an embodiment, when the video decoding apparatus 100 splits the current coding unit 1100 or 1150 having a non-square shape based on split shape information, the video decoding apparatus 100 may split the current coding unit 1100 or 1150 considering locations of long sides of the current coding unit 1100 or 1150 having a non-square shape. For example, the video decoding apparatus 100 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the video decoding apparatus 100 may determine the odd number of coding units included in the current coding unit 1100 or 1150. For example, when split shape information indicates that the current coding unit 1100 or 1150 is split into three coding units, the video decoding apparatus 100 may split the current coding unit 1100 or 1150 into three coding units 1130a through 1130c or 1180a through 1180c. According to an embodiment, the video decoding apparatus 100 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is split may have a plurality of types of sizes, and in some cases, the coding units 1130a through 1130c or 1180a through 1180c may have different sizes.

According to an embodiment, when split shape information indicates that a coding unit is split into an odd number of blocks, the video decoding apparatus 100 may determine the odd number of coding units included in the current coding unit 1100 or 1150, and in addition, may set a certain limit on at least one coding unit from among the odd number of coding units generated via splitting. Referring to FIG. 11, the video decoding apparatus 100 may differentiate decoding processes performed on the coding unit 1130b or 1180b located at the center from among the three coding units 1130a through 1130c or 1180a through 1180c generated as the current coding unit 1100 or 1150 is split from the other coding units 1130a and 1130c or 1180a and 1180c. For example, the video decoding apparatus 100 may limit the coding unit 1130b or 1180b located at the center to be no longer split unlike the other coding units 1130a and 1130c or 1180a and 1180c, or to be split only a certain number of times.

Figure 12:
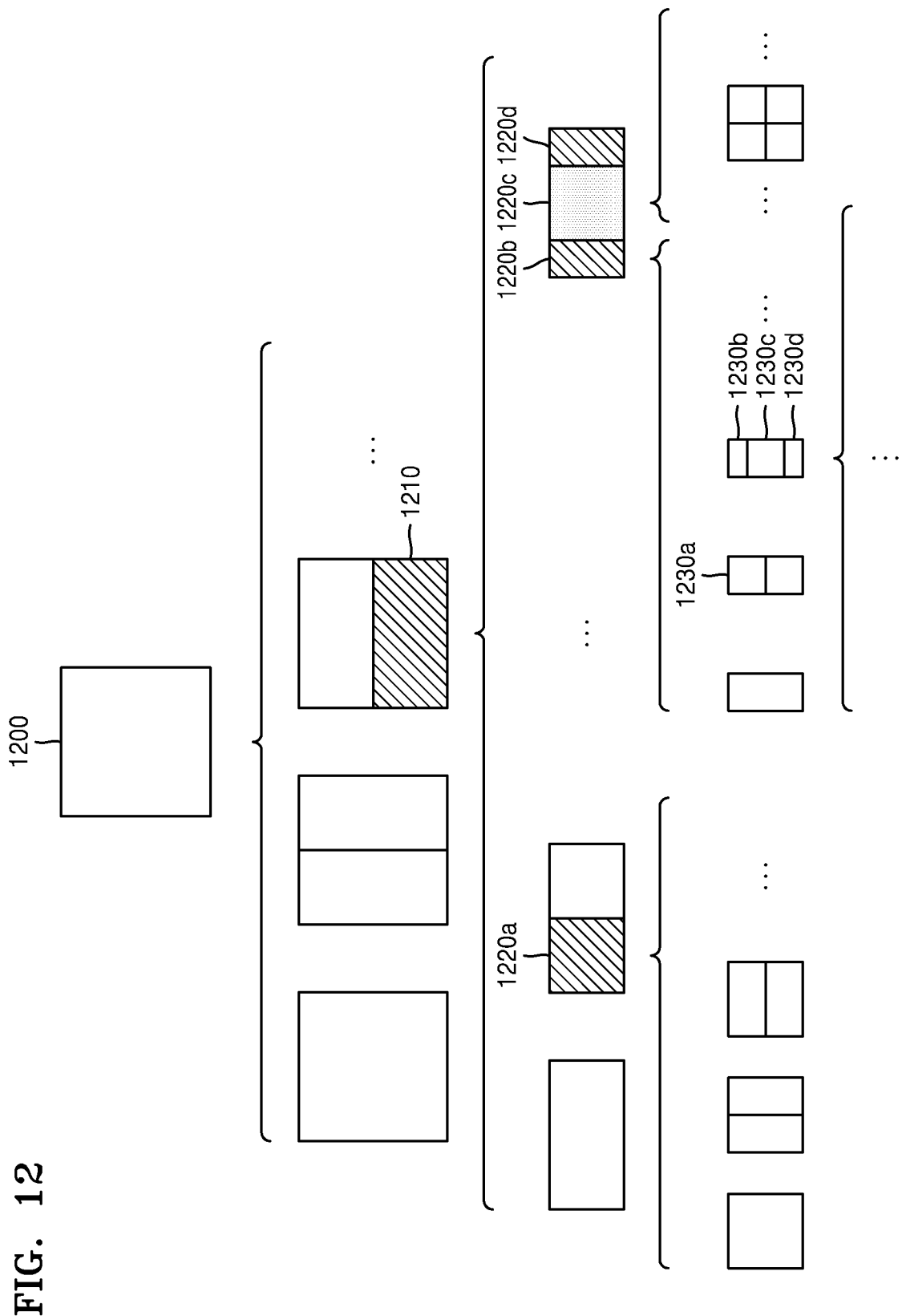
FIG. 12 illustrates processes of splitting a coding unit, based on at least one of a block shape information and split shape information, according to an embodiment.

FIG. 12 illustrates processes of the video decoding apparatus 100 splitting a coding unit, based on at least one of a block shape information and split shape information, according to an embodiment.

According to an embodiment, the video decoding apparatus 100 may determine that a first coding unit 1200 having a square shape is split or not split into coding units, based on at least one of block shape information and split shape information. According to an embodiment, when split shape information indicates that the first coding unit 1200 is split in a horizontal direction, the video decoding apparatus 100 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the video decoding apparatus 100 may determine that the determined second coding unit 1210 is split or not split into coding units based on at least one of block shape information and split shape information. Referring to FIG. 12, the video decoding apparatus 100 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split shape information. The video decoding apparatus 100 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information. According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220a through 1220d) based on at least one of block shape information and split shape information with respect to the second coding unit 1210. In other words, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b through 1220d determined when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit 1240 having a non-square shape from among the plurality of fourth coding units may again be split into a plurality of coding units. For example, the fourth coding unit 1240 having a non-square shape may be split into an odd number of coding units 1250a through 1250c.

A method that may be used to recursively split a coding unit will be described below through various embodiments.

According to an embodiment, the video decoding apparatus 100 may determine that each of the third coding units 1220a through 1220d is split into coding units or that the second coding unit 1210 is not split, based on at least one of block shape information and split shape information. The video decoding apparatus 100 may split the second coding unit 1210 having a non-square shape into the odd number of third coding units 1220b through 1220d, according to an embodiment. The video decoding apparatus 100 may set a certain limit on a certain third coding unit from among the third coding units 1220b through 1220d. For example, the video decoding apparatus 100 may limit that the third coding unit 1220c located at the center of the third coding units 1220b through 1220d is no longer split, or is split into a settable number of times. Referring to FIG. 12, the video decoding apparatus 100 may limit that the third coding unit 1220c located at the center of the third coding units 1220b through 1220d included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the video decoding apparatus 100 may obtain at least one of block shape information and split shape information used to split a current coding unit from a certain location in the current coding unit.

Figure 13:
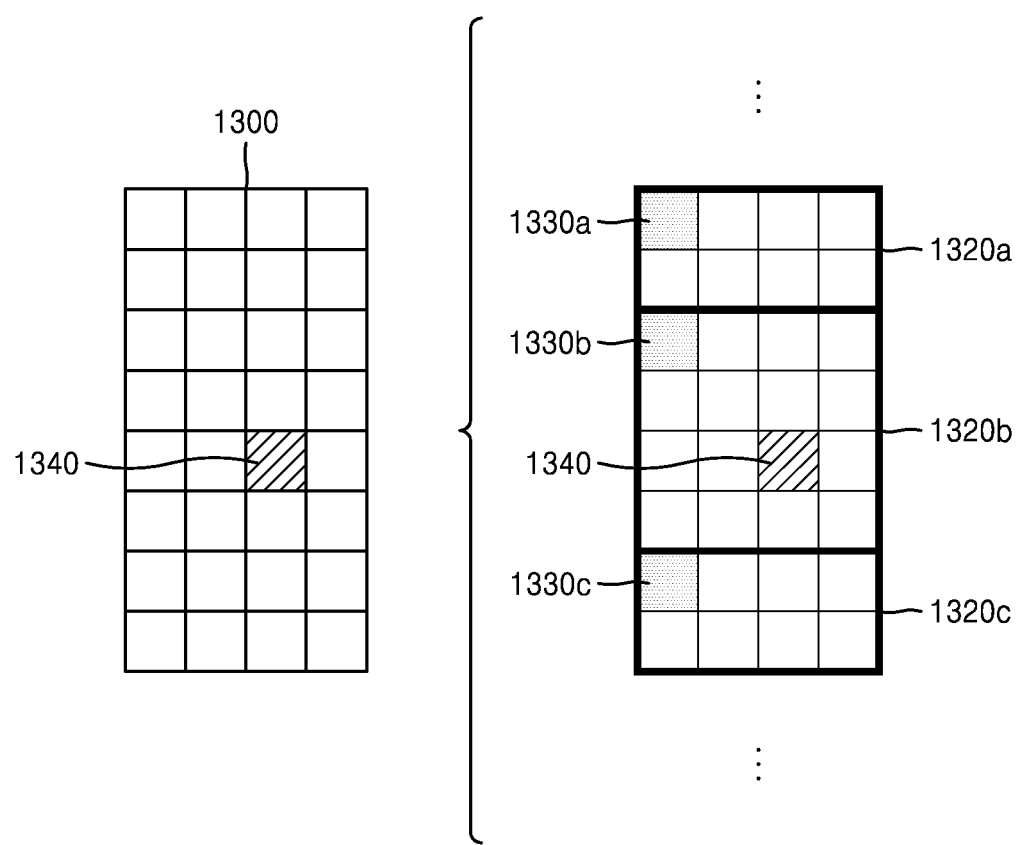
FIG. 13 illustrates a method of determining a certain coding unit from among an odd number of coding units, according to an embodiment.

FIG. 13 illustrates a method of determining, by the video decoding apparatus 100, a certain coding unit from among an odd number of coding units, according to an embodiment. Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The video decoding apparatus 100 may determine that a current coding unit is split into coding units having various shapes and sizes or is not split by obtaining at least one of block shape information and split shape information from a certain location.

According to an embodiment, the video decoding apparatus 100 may select one coding unit when a current coding unit is split into a certain number of coding units. A method of selecting one of a plurality of coding units may vary, and details thereof will be described below through various embodiments.

According to an embodiment, the video decoding apparatus 100 may split a current coding unit into a plurality of coding units, and determine a coding unit at a certain location.

FIG. 13 illustrates a method of determining, by the video decoding apparatus 100, a coding unit at a certain location from among an odd number of coding units, according to an embodiment.

According to an embodiment, the video decoding apparatus 100 may use information indicating a location of each of the odd number of coding units so as to determine a coding unit located at the center from among the odd number of coding units. Referring to FIG. 13, the video decoding apparatus 100 may determine the odd number of coding units 1320a through 1320c by splitting the current coding unit 1300. The video decoding apparatus 100 may determine the center coding unit 1320b by using information about the locations of the odd number of coding units 1320a through 1320c. For example, the video decoding apparatus 100 may determine the coding unit 1320b located at the center by determining the locations of the coding units 1320a through 1320b based on information indicating locations of certain samples included in the coding units 1320a through 1320c. In detail, the video decoding apparatus 100 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the video decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The video decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the video decoding apparatus 100 may split the current coding unit 1300 into the plurality of coding units 1320a through 1320c, and select a coding unit from the coding units 1320a through 1320c according to a certain standard. For example, the video decoding apparatus 100 may select the coding unit 1320*b* having a different size from among the coding units 1320*a* through 1320*c*.

According to an embodiment, the video decoding apparatus 100 may determine widths or heights of the coding units 1320*a* through 1320*c* by respectively using the (xa, ya) coordinates, i.e., the information indicating the location of the upper left sample 1330*a* of the upper coding unit 1320*a*, the (xb, yb) coordinates, i.e., the information indicating the location of the upper left sample 1330*b* of the center coding unit 1320*b*, and the (xc, yc) coordinates, i.e., the information indicating the location of the upper left sample 1330*c* of the lower coding unit 1320*c*. The video decoding apparatus 100 may determine the sizes of the coding units 1320*a* through 1320*c* by respectively using the coordinates (xa, ya), (xb, yb), and (xc, yc) indicating the locations of the coding units 1320*a* through 1320*c*.

According to an embodiment, the video decoding apparatus 100 may determine the width of the upper coding unit 1320*a* to be xb-xa, and the height to be yb-ya. According to an embodiment, the video decoding apparatus 100 may determine the width of the center coding unit 1320*b* to be xc-xb, and the height to be yc-yb. According to an embodiment, the video decoding apparatus 100 may determine the width or height of the lower coding unit 1320*c* by using the width and height of the current coding unit 1300 and the widths and heights of the upper coding unit 1320*a* and center coding unit 1320*b*. The video decoding apparatus 100 may determine a coding unit having a different size from other coding units based on the determined widths and heights of the coding units 1320*a* through 1320*c*. Referring to FIG. 13, the video decoding apparatus 100 may determine the center coding unit 1320*b* having a size different from those of the upper coding unit 1320*a* and lower coding unit 1320*c* as a coding unit at a certain location. However, processes of the video decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the video decoding apparatus 100 may select a coding unit at a certain location from among an odd number of coding units determined when a current coding unit is split, while considering a shape of the current coding unit. For example, when the current coding unit has a non-square shape in which a width is longer than a height, the video decoding apparatus 100 may determine a coding unit at a certain location in a horizontal direction. In other words, the video decoding apparatus 100 may determine one of coding units having a different location in the horizontal direction and set a limit on the one coding unit. When the current coding unit has a non-square shape in which a height is longer than a width, the video decoding apparatus 100 may determine a coding unit at a certain location in a vertical direction. In other words, the video decoding apparatus 100 may determine one of coding units having a different location in the vertical direction and set a limit on the one coding unit.

According to an embodiment, the video decoding apparatus 100 may use information indicating a location of each of an even number of coding units so as to determine a coding unit at a certain location from among the even number of coding units. The video decoding apparatus 100 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the video decoding apparatus 100 may use at least one of block shape information and split shape information stored in a sample included in a center coding unit during splitting processes so as to determine a coding unit located at the center from among a plurality of coding units obtained by splitting a current coding unit.

Referring to FIG. 13, the video decoding apparatus 100 may split the current coding unit 1300 into the plurality of coding units 1320*a* through 1320*c* based on at least one of block shape information and split shape information, and determine the coding unit 1320*b* located at the center from among the plurality of coding units 1320*a* through 1320*c*. In addition, the video decoding apparatus 100 may determine the coding unit 1320*b* located at the center considering a location from which at least one of the block shape information and the split shape information is obtained. In other words, at least one of the block shape information and the split shape information of the current coding unit 1300 may be obtained from the sample 1340 located at the center of the current coding unit 1300, and when the current coding unit 1300 is split into the plurality of coding units 1320*a* through 1320*c* based on at least one of the block shape information and the split shape information, the coding unit 1320*b* including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the video decoding apparatus 100 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320*a* through 1320*c* determined when the current coding unit 1300 is split. In other words, the video decoding apparatus 100 may determine the sample at the certain location considering a block shape of the current coding unit 1300, and determine and set a certain limit on the coding unit 1320*b* including a sample from which certain information (for example, at least one of block shape information and split shape information) is obtainable, from among the plurality of coding units 1320*a* through 1320*c* determined when the current coding unit 1300 is split.

Referring to FIG. 13, according to an embodiment, the video decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the video decoding apparatus 100 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the video decoding apparatus 100 may determine, as a sample from which certain information is obtainable, one of samples adjacent to a boundary of splitting long sides of the current coding unit into halves.

According to an embodiment, when a current coding unit is split into a plurality of coding units, the video decoding apparatus 100 may use at least one of block shape information and split shape information so as to determine a coding unit at a certain location from among the plurality of coding units. According to an embodiment, the video decoding apparatus 100 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. In other words, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the video decoding apparatus 100 may determine at least one coding unit by splitting a current coding unit, and determine an order of decoding the at least one coding unit according to a certain block (for example, the current coding unit).

Figure 14:
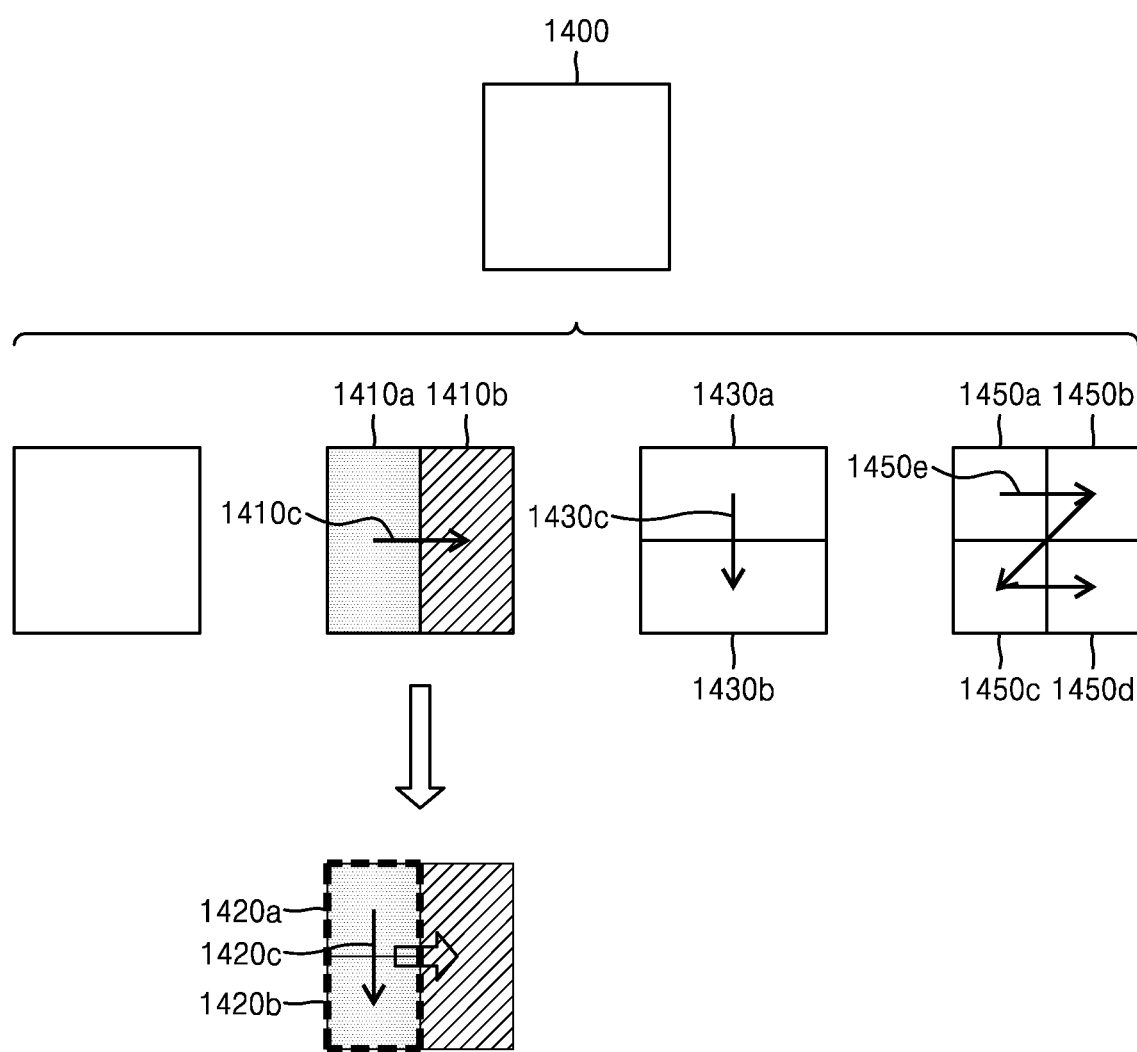
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the video decoding apparatus 100 splits a current coding unit, according to an embodiment.

According to an embodiment, the video decoding apparatus 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a through 1450d by splitting the first coding unit 140 in horizontal and vertical directions, according to block shape information and split shape information.

Referring to FIG. 14, the video decoding apparatus 100 may determine the second coding units 1410a and 1410b, which are determined by splitting the first coding unit 1400 in the vertical direction, to be processed in a horizontal direction 1410c. The video decoding apparatus 100 may determine the second coding units 1430a and 1430b, which are determined by splitting the first coding unit 1400 in the horizontal direction, to be processed in a vertical direction 1430c. The video decoding apparatus 100 may determine the second coding units 1450a through 1450d, which are determined by splitting the first coding unit 1400 in the vertical and horizontal directions, to be processed according to a certain order in which coding units located in one row is processed and then coding units located in a next row is processed (for example, a raster scan order or a z-scan order 1450e).

According to an embodiment, the video decoding apparatus 100 may recursively split coding units. Referring to FIG. 14, the video decoding apparatus 100 may determine the plurality of second coding units 1410a and 1410b, 1430a and 1430b, or 1450a through 1450d by splitting the first coding unit 1400, and recursively split each of the plurality of second coding units 1410a and 1410b, 1430a and 1430b, or 1450a through 1450d. A method of splitting the plurality of second coding units 1410a and 1410b, 1430a and 1430b, or 1450a through 1450d may correspond to a method of splitting the first coding unit 1400. Accordingly, each of the plurality of second coding units 1410a and 1410b, 1430a and 1430b, or 1450a through 1450d may be independently split into a plurality of coding units. Referring to FIG. 14, the video decoding apparatus 100 may determine the second coding units 1410a and 1410b by splitting the first coding unit 1400 in the vertical direction, and in addition, determine that each of the second coding units 1410a and 1410b is independently split or not split.

According to an embodiment, the video decoding apparatus 100 may split the second coding unit 1410a at the left in a horizontal direction into third coding units 1420a and 1420b, and may not split the second coding unit 1410b at the right.

According to an embodiment, an order of processing coding units may be determined based on split processes of coding units. In other words, an order of processing coding units that are split may be determined based on an order of processing coding units before being split. The video decoding apparatus 100 may determine an order of processing the third coding units 1420a and 1420b determined when the second coding unit 1410a at the left is split independently from the second coding unit 1410b at the right. Since the third coding units 1420a and 1420b are determined when the second coding unit 1410a at the left is split in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being split, but such processes are not limited to the above embodiments, and any method of independently processing, in a certain order, coding units split into various shapes may be used.

Figure 15:
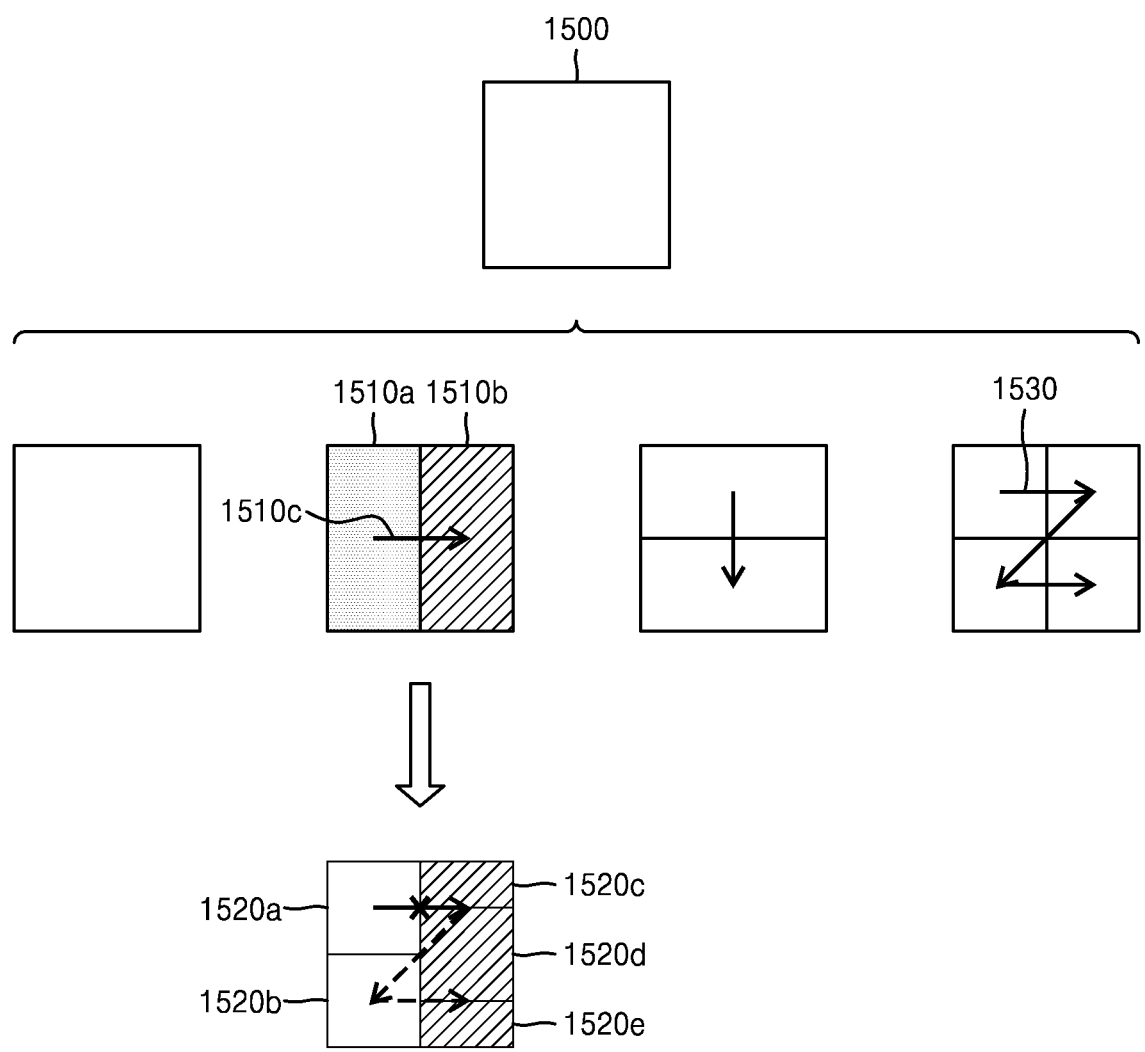
FIG. 15 illustrates processes of determining that a current coding unit is split into an odd number of coding units when coding units are not processable in a certain order, according to an embodiment.

FIG. 15 illustrates processes of determining that a current coding unit is split into an odd number of coding units when coding units are not processable in a certain order by the video decoding apparatus 100, according to an embodiment.

According to an embodiment, the video decoding apparatus 100 may determine that a current coding unit is split into an odd number of coding units based on obtained block shape information and split shape information. Referring to FIG. 15, a first coding unit 1500 having a square shape may be split into second coding units 1510a and 1510b having a non-square shape, and the second coding units 1510a and 1510b may be independently respectively split into third coding units 1520a and 1520b, and 1520c through 1520e. According to an embodiment, the video decoding apparatus 100 may split the second coding unit 1510a at the left from among the second coding units 1510a and 1510b into a horizontal direction to determine the plurality of third coding units 1520a and 1520b, and split the second coding unit 1510b at the right into the odd number of third coding units 1520c through 1520e.

According to an embodiment, the video decoding apparatus 100 may determine whether a coding unit split into an odd number exists by determining whether the third coding units 1520a through 1520e are processable in a certain order. Referring to FIG. 15, the video decoding apparatus 100 may determine the third coding units 1520a through 1520e by recursively splitting the first coding unit 1500. The video decoding apparatus 100 may determine, based on at least one of block shape information and split shape information, whether a coding unit is split into an odd number from among shapes into which the first coding unit 1500, the second coding units 1510a and 1510b, or the third coding units 1520a through 1520e are split. For example, the second coding unit 1510b at the right from among the second coding units 1510a and 1510b may be split into the odd number of third coding units 1520c through 1520e. An order of processing a plurality of coding units included in the first coding unit 1500 may be a certain order (for example, a z-scan order 1530), and the video decoding apparatus 100 may determine whether the third coding units 1520c through 1520e determined when the second coding unit 1510b at the right is split into an odd number satisfy a condition of being processable according to the certain order.

According to an embodiment, the video decoding apparatus 100 may determine whether the third coding units 1520a through 1520e included in the first coding unit 1500 satisfy a condition of being processable according to a certain order, wherein the condition is related to whether at least one of a width and a height of each of the second coding units 1510a and 1510b is split into halves according to boundaries of the third coding units 1520a through 1520e. For example, the third coding units 1520a and 1520b determined when the height of the second coding unit 1510a at the left and having a non-square shape is split into halves satisfy the condition, but it may be determined that the third coding units 1520c through 1520e do not satisfy the condition because the boundaries of the third coding units 1520c through 1520e that are determined when the second coding unit 1510b at the right is split into three coding units do not split the width or height of the second coding unit 1510b at the right into halves. The video decoding apparatus 100 may determine disconnection of a scan order when the condition is not satisfied, and determine that the second coding unit 1510b at the right is split into the odd number of coding units, based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

Figure 16:
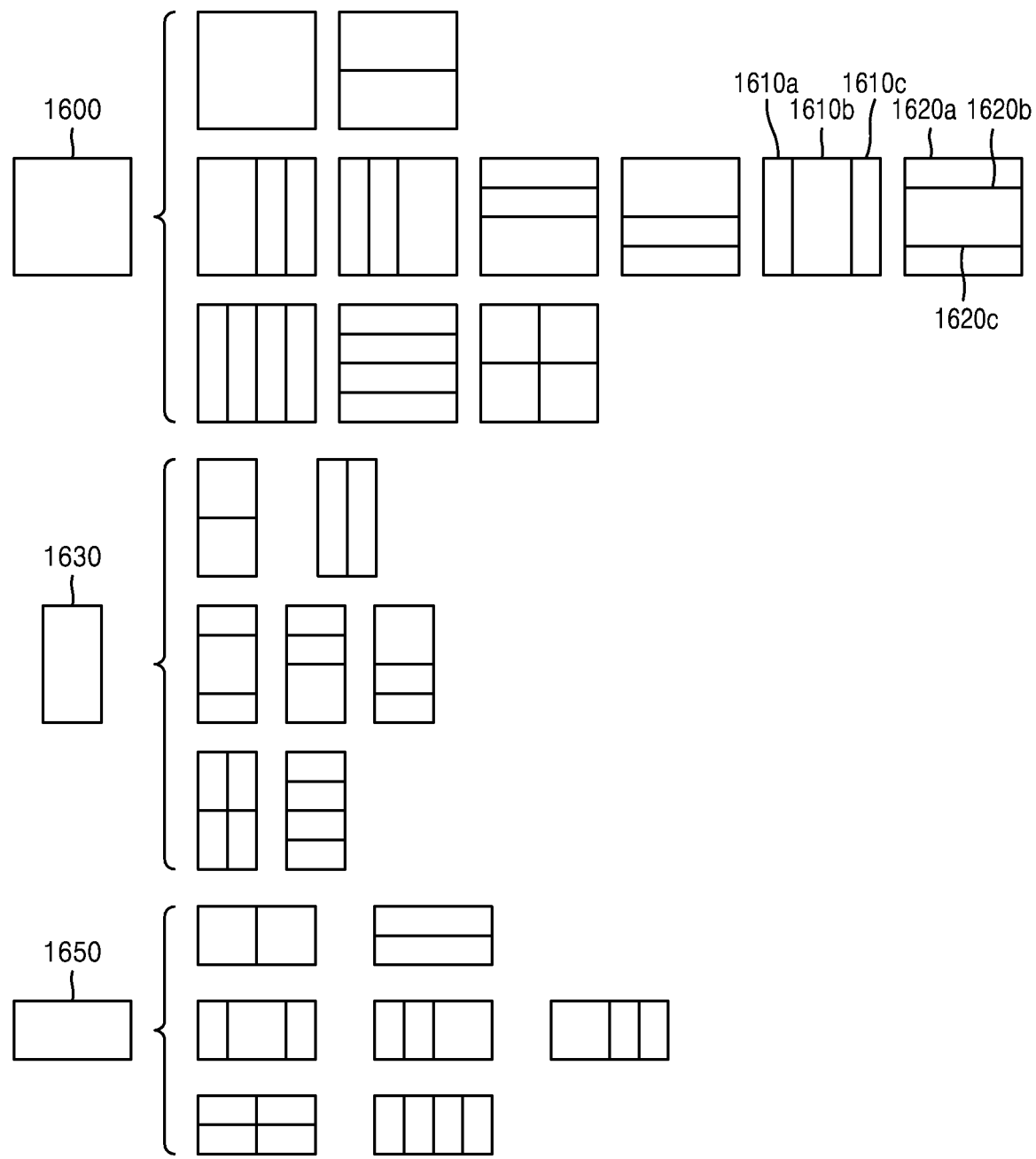
FIG. 16 illustrates processes of determining at least one coding unit when a first coding unit is split, according to an embodiment.

FIG. 16 illustrates processes of determining at least one coding unit when the video decoding apparatus 100 splits a first coding unit 1600, according to an embodiment. According to an embodiment, the video decoding apparatus 100 may split the first coding unit 1600 based on at least one of obtained block shape information and split shape information obtained. The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the video decoding apparatus 100 may split the first coding unit 1600 into a plurality of non-square coding units. In detail, when split shape information indicates that an odd number of coding units are determined by splitting the first coding unit 1600 in a horizontal direction or a vertical direction, the video decoding apparatus 100 may determine, as the odd number of coding units, second coding units 1610a through 1610c by splitting the first coding unit 1600 having a square shape in a vertical direction, or second coding units 1620a through 1620c by splitting the first coding unit 1600 in a horizontal direction.

According to an embodiment, the video decoding apparatus 100 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is split into halves according to boundaries of the second coding units 1610a through 1610c and 1620a through 1620c. Referring to FIG. 16, since the boundaries of the second coding units 1610a through 1610c determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is split in a horizontal direction do not split the height of the first coding unit 1600 into halves, it may be determined that the first coding unit 1600 does not satisfy the condition of being processable in a certain order. The video decoding apparatus 100 may determine disconnection of a scan order when the condition is not satisfied, and determine that the first coding unit 1600 is split into the odd number of coding units based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

According to an embodiment, the video decoding apparatus 100 may determine coding units having various shapes by splitting a first coding unit.

Referring to FIG. 16, the video decoding apparatus 100 may split the first coding unit 1600 having a square shape and a first coding unit 1630 or 1650 having a non-square shape into coding units having various shapes.

Figure 17:
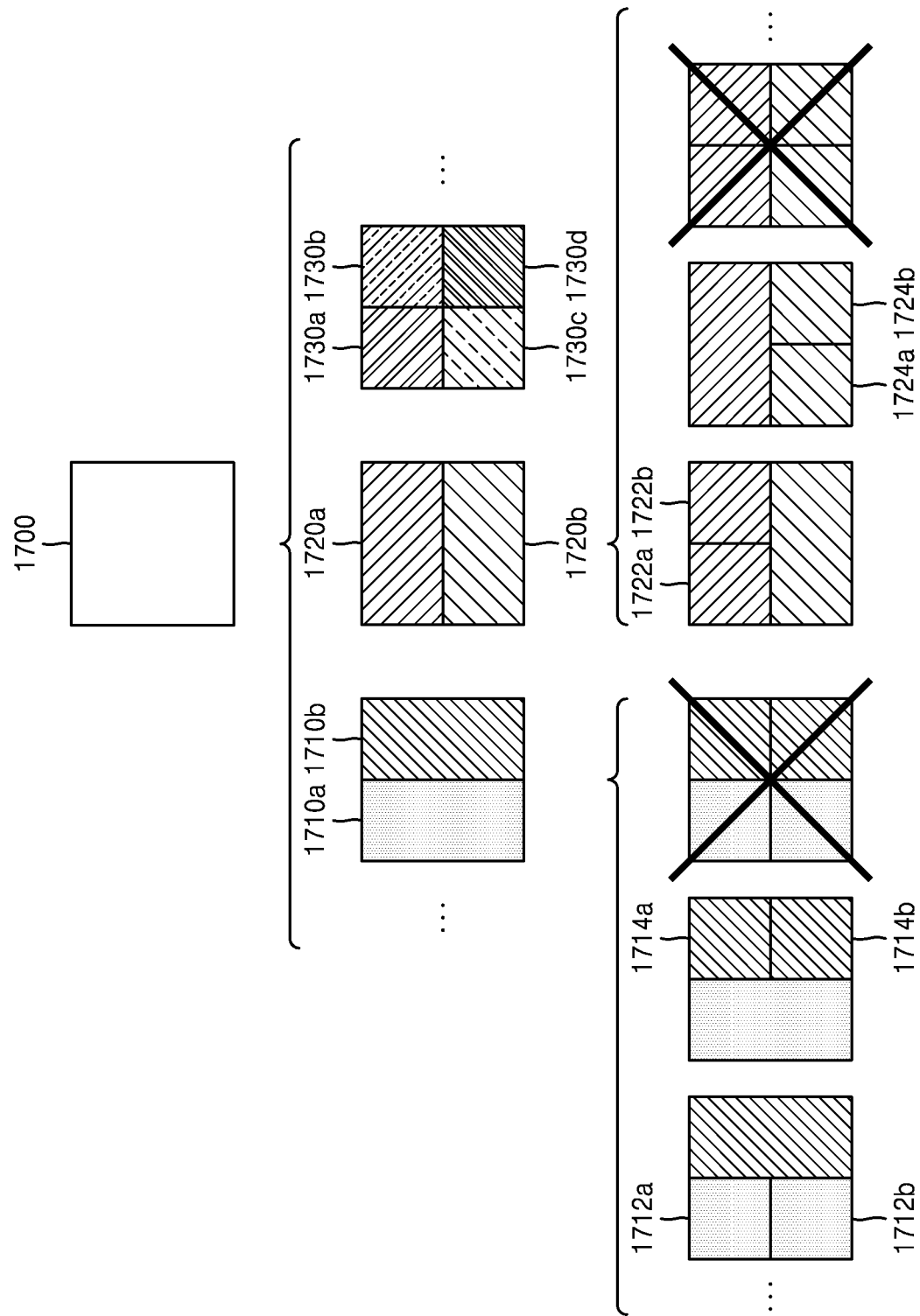
FIG. 17 illustrates that a shape into which a second coding unit is splittable is restricted when the second coding unit having a non-square shape determined when a first coding unit is split satisfies a certain condition, according to an embodiment.

FIG. 17 illustrates that a shape into which a second coding unit is splittable by the video decoding apparatus 100 is restricted when the second coding unit having a non-square shape determined when a first coding unit 1700 is split satisfies a certain condition, according to an embodiment.

According to an embodiment, the video decoding apparatus 100 may determine that the first coding unit 1700 having a square shape is split into second coding units 1710*a* and 1710*b* or 1720*a* and 1720*b* having a non-square shape, based on at least one of obtained block shape information and split shape information. The second coding units 1710*a* and 1710*b* or 1720*a* and 1720*b* may be independently split. Accordingly, the video decoding apparatus 100 may determine that the second coding units 1710*a* and 1710*b* or 1720*a* and 1720*b* are split into a plurality of coding units or are not split based on at least one of block shape information and split shape information related to each of the coding units 1710*a* and 1710*b* or 1720*a* and 1720*b*. According to an embodiment, the video decoding apparatus 100 may determine third coding units 1712*a* and 1712*b* by splitting, in a horizontal direction, the second coding unit 1710*a* at the left having a non-square shape, which is determined when the first coding unit 1700 is split in a vertical direction. However, when the second coding unit 1710*a* at the left is split in the horizontal direction, the video decoding apparatus 100 may set a limit that the second coding unit 1710*b* at the right is not split in the horizontal direction like the second coding unit 1710*a* at the left. When third coding units 1714*a* and 1714*b* are determined when the second coding unit 1710*b* at the right is split in the same direction, i.e., the horizontal direction, the third coding units 1712*a*, 1712*b*, 1714*a*, and 1714*b* are determined when the second coding units 1710*a* at the left and the second coding unit 1710*b* at the right are each independently split in the horizontal direction. However, this is the same result as splitting the first coding unit 1700 into four second coding units 1730*a* through 1730*d* having a square shape based on at least one of block shape information and split shape information, and thus may be inefficient in terms of video decoding.

According to an embodiment, the video decoding apparatus 100 may determine third coding units 1722*a* and 1722*b* or 1724*a*, and 1724*b* by splitting, in a vertical direction, the second coding unit 1720*a* or 1720*b* having a non-square shape determined when the first coding unit 1700 is split in the horizontal direction. However, when one of second coding units (for example, the second coding unit 1720*a* at the top) is split in a vertical direction, the video decoding apparatus 100 may set a limit that the other second coding unit (for example, the second coding unit 1720*b* at the bottom) is not split in the vertical direction like the second coding unit 1720*a* at the top for the above described reasons.

Figure 18:
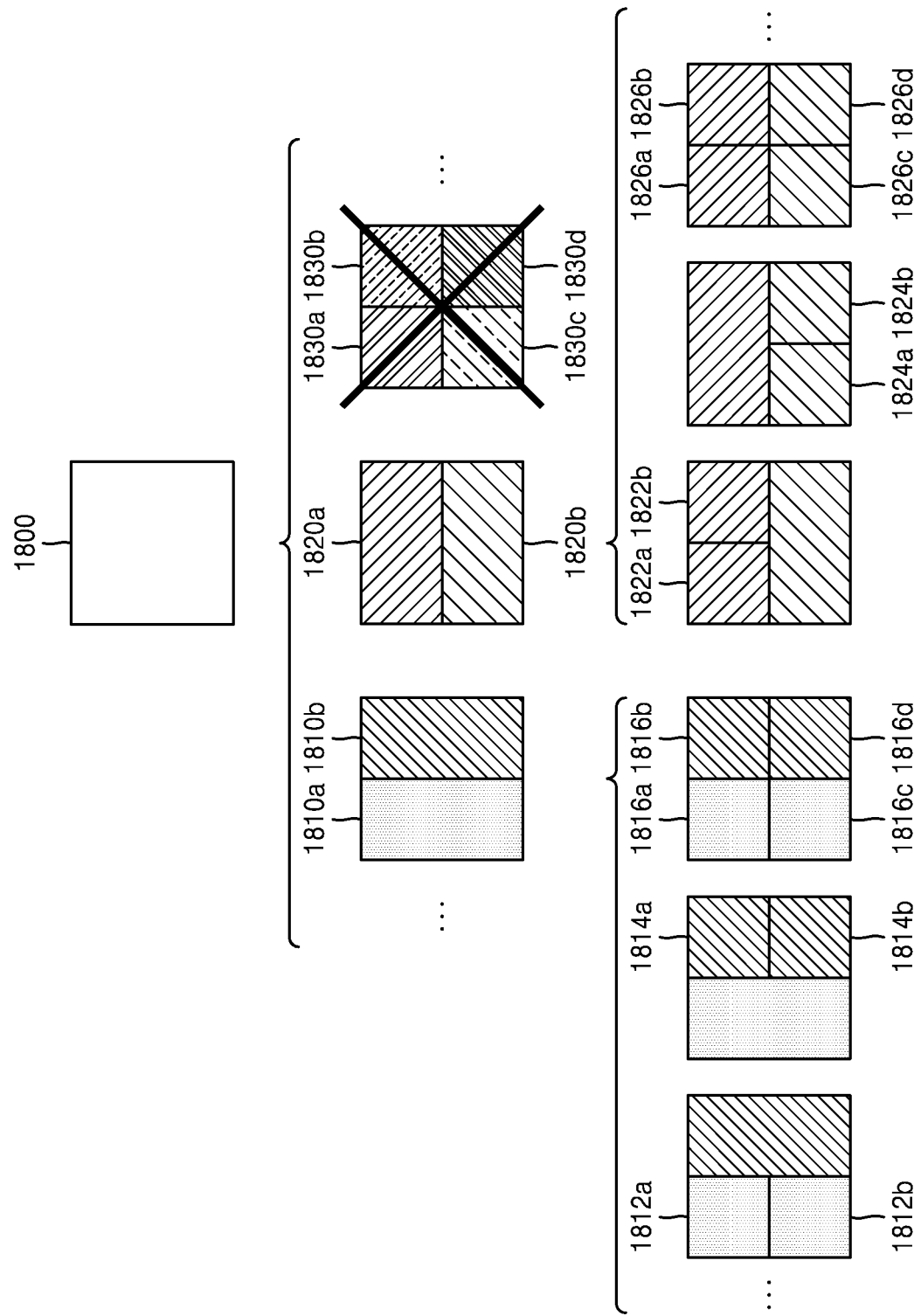
FIG. 18 illustrates processes of splitting a coding unit having a square shape when split shape information is unable to indicate that a coding unit is split into four square shapes, according to an embodiment.

FIG. 18 illustrates processes of the video decoding apparatus 100 splitting a coding unit having a square shape when split shape information is unable to indicate that a coding unit is split into four square shapes, according to an embodiment.

According to an embodiment, the video decoding apparatus 100 may determine second coding units 1810*a* and 1810*b*, or 1820*a* and 1820*b*, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the video decoding apparatus 100 is unable to split the first coding unit 1800 having a square shape into four second coding units 1830 through 1830*d* having a square shape. The video decoding apparatus 100 may determine the second coding units 1810*a* and 1810*b*, or 1820*a* and 1820*b* having a non-square shape based on the split shape information.

According to an embodiment, the video decoding apparatus 100 may independently split each of the second coding units 1810*a* and 1810*b*, or 1820*a* and 1820*b* having a non-square shape. Each of the second coding units 1810*a* and 1810*b*, or 1820*a* and 1820*b* may be split in a certain order via a recursive method that may be a split method corresponding to a method of splitting the first coding unit 1800 based on at least one of the block shape information and the split shape information.

For example, the video decoding apparatus 100 may determine third coding units 1812*a* and 1812*b* having a square shape by splitting the second coding unit 1810*a* at the left in a horizontal direction, or determine third coding units 1814*a* and 1814*b* having a square shape by splitting the second coding unit 1810*b* at the right in a horizontal direction. In addition, the video decoding apparatus 100 may determine third coding units 1816*a* through 1816*d* having a square shape by splitting both the second coding unit 1810*a* at the left and the second coding unit 1810*b* at the right in the horizontal direction. In this case, coding units may be determined in the same manner as when the first coding unit 1800 is split into four second coding units 1830*a* through 1830*d* having a square shape.

As another example, the video decoding apparatus 100 may determine third coding units 1822*a* and 1822*b* having a square shape by splitting the second coding unit 1820*a* at the top in a vertical direction, and determine third coding units 1824*a* and 1824*b* having a square shape by splitting the second coding unit 1820*b* at the bottom in a vertical direction. In addition, the video decoding apparatus 100 may determine third coding units 1826*a* through 1826*d* having a square shape by splitting both the second coding unit 1820*a* at the top and the second coding unit 1820*b* at the bottom in the vertical direction. In this case, coding units may be determined in the same manner as when the first coding unit 1800 is split into four second coding units 1830*a* through 1830*d* having a square shape.

Figure 19:
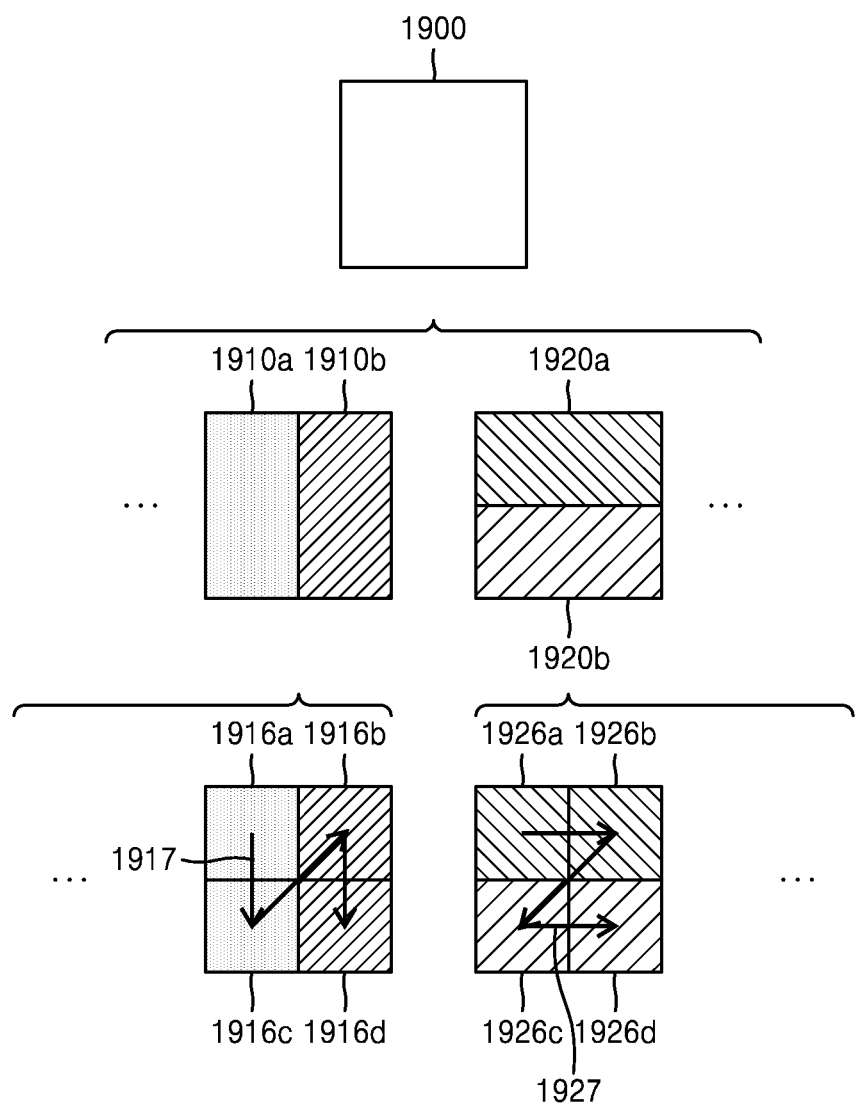
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the video decoding apparatus 100 may split a first coding unit 1900 based on block shape information and split shape information. When the block shape information indicates a square shape and the split shape information indicates that the first coding unit 1900 is split in at least one of a horizontal direction and a vertical direction, the video decoding apparatus 100 may split the first coding unit 1900 to determine second coding units 1910*a* and 1910*b*, or 1920*a* and 1920*b*. Referring to FIG. 19, the second coding units 1910*a* and 1910*b*, or 1920*a* and 1920*b* having a non-square shape and determined when the first coding unit 1900 is split in the horizontal direction or the vertical direction may each be independently split based on block shape information and split shape information. For example, the video decoding apparatus 100 may determine third coding units 1916*a* through 1916*d* by splitting, in the horizontal direction, each of the second coding units 1910*a* and 1910*b* generated as the first coding unit 1900 is split in the vertical direction, or determine third coding units 1926*a* through 1926*d* by splitting, in the horizontal direction, the second coding units 1920*a* and 1920*b* generated as the first coding unit 1900 is split in the horizontal direction. Processes of splitting the second coding units 1910*a* and 1910*b*, or 1920*a* and 1920*b* have been described above with reference to FIG. 17, and thus details thereof are not provided again.

According to an embodiment, the video decoding apparatus 100 may process coding units according to a certain order. Features about processing coding units according to a certain order have been described above with reference to FIG. 14, and thus details thereof are not provided again. Referring to FIG. 19, the video decoding apparatus 100 may determine four third coding units 1916a through 1916d or 1926a through 1926d having a square shape by splitting the first coding unit 1900 having a square shape. According to an embodiment, the video decoding apparatus 100 may determine an order of processing the third coding units 1916a through 1916d or 1926a through 1926d based on how the first coding unit 1900 is split.

According to an embodiment, the video decoding apparatus 100 may determine the third coding units 1916a through 1916d by splitting, in the horizontal direction, the second coding units 1910a and 1910b generated as the first coding unit 1900 is split in the vertical direction, and process the third coding units 1916a through 1916d according to an order 1917 of first processing, in the vertical direction, the third coding units 1916a and 1916b included in the second coding unit 1910a at the left, and then processing, in the vertical direction, the third coding units 1916c and 1916d included in the second coding unit 1910b at the right.

According to an embodiment, the video decoding apparatus 100 may determine the third coding units 1926a through 1926d by splitting, in the vertical direction, the second coding units 1920a and 1920b generated as the first coding unit 1900 is split in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each split. The second coding units 1910a and 1910b determined when the first coding unit 1900 is split in the vertical direction and the second coding units 1920a and 1920b determined when the first coding unit 1900 is split in the horizontal direction are split in different shapes, but according to the third coding units 1916a through 1916d and 1926a through 1926d determined afterwards, the first coding unit 1900 is split in coding units having same shapes. Accordingly, the video decoding apparatus 100 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined when the coding unit is recursively split, according to an embodiment.

According to an embodiment, the video decoding apparatus 100 may determine a depth of a coding unit according to a certain standard. For example, the certain standard may be a length of a long side of the coding unit. When a length of a long side of a current coding unit is split $2n$ times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the video decoding apparatus 100 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by $\frac{1}{2}^1$ may have a size of N×N. In addition, the third coding unit 2004 determined by splitting a width and a height of the second coding unit 2002 by ½ may have a size of N/2×N/2. In this case, a width and a height of the third coding unit 2004 corresponds to $\frac{1}{2}^2$ of the first coding unit 2000. When a depth of first coding unit 2000 is D, a depth of the second coding unit 2002 having $\frac{1}{2}^1$ of the width and the height of the first coding unit 2000 may be D+1, and a depth of the third coding unit 2004 having $\frac{1}{2}^2$ of the width and the height of the first coding unit 2000 may be D+2.

According to an embodiment, the video decoding apparatus 100 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The video decoding apparatus 100 may determine a second coding unit (for example, the second coding unit 2002, 2012, or 2022) by splitting at least one of a width and a height of the first coding unit 2010 having a size of N×2N. In other words, the video decoding apparatus 100 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

The video decoding apparatus 100 may determine a second coding unit (for example, the second coding unit 2002, 2012, or 2022) by splitting at least one of a width and a height of the first coding unit 2020 having a size of 2N×N. In other words, the video decoding apparatus 100 may determine the second coding unit 2002 having a size of N×N or the second coding unit 2012 having a size of N/2×N by splitting the first coding unit 2020 in a vertical direction, or determine the second coding unit 2022 having a size of N×N/2 by splitting the first coding unit 2010 in horizontal and vertical directions.

According to an embodiment, the video decoding apparatus 100 may determine a third coding unit (for example, the third coding unit 2004, 2014, or 2024) by splitting at least one of a width and a height of the second coding unit 2002 having a size of N×N. In other words, the video decoding apparatus 100 may determine the third coding unit 2004 having a size of N/2×N/2, the third coding unit 2014 having a size of N/2²×N/2, or the third coding unit 2024 having a size of N/2×N/2² by splitting the second coding unit 2002 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N/2×N. In other words, the video decoding apparatus 100 may determine the third coding unit 2004 having a size of N/2×N/2 or the third coding unit 2024 having a size of N/2×N/$2^2$ by splitting the second coding unit 2012 in a horizontal direction, or the third coding unit 2014 having a size of N/$2^2$×N/2 by splitting the second coding unit 2012 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N×N/2. In other words, the video decoding apparatus 100 may determine the third coding unit 2004 having a size of N/2×N/2 or the third coding unit 2014 having a size of N/$2^2$×N/2 by splitting the second coding unit 2022 in a vertical direction, or the third coding unit 2024 having a size of N/2×N/$2^2$ by splitting the second coding unit 2022 in vertical and horizontal directions.

According to an embodiment, the video decoding apparatus 100 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be $½^2$ of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is $½^2$ of the width and the height of the first coding unit 2010 or 202 may be D+2.

Figure 21:
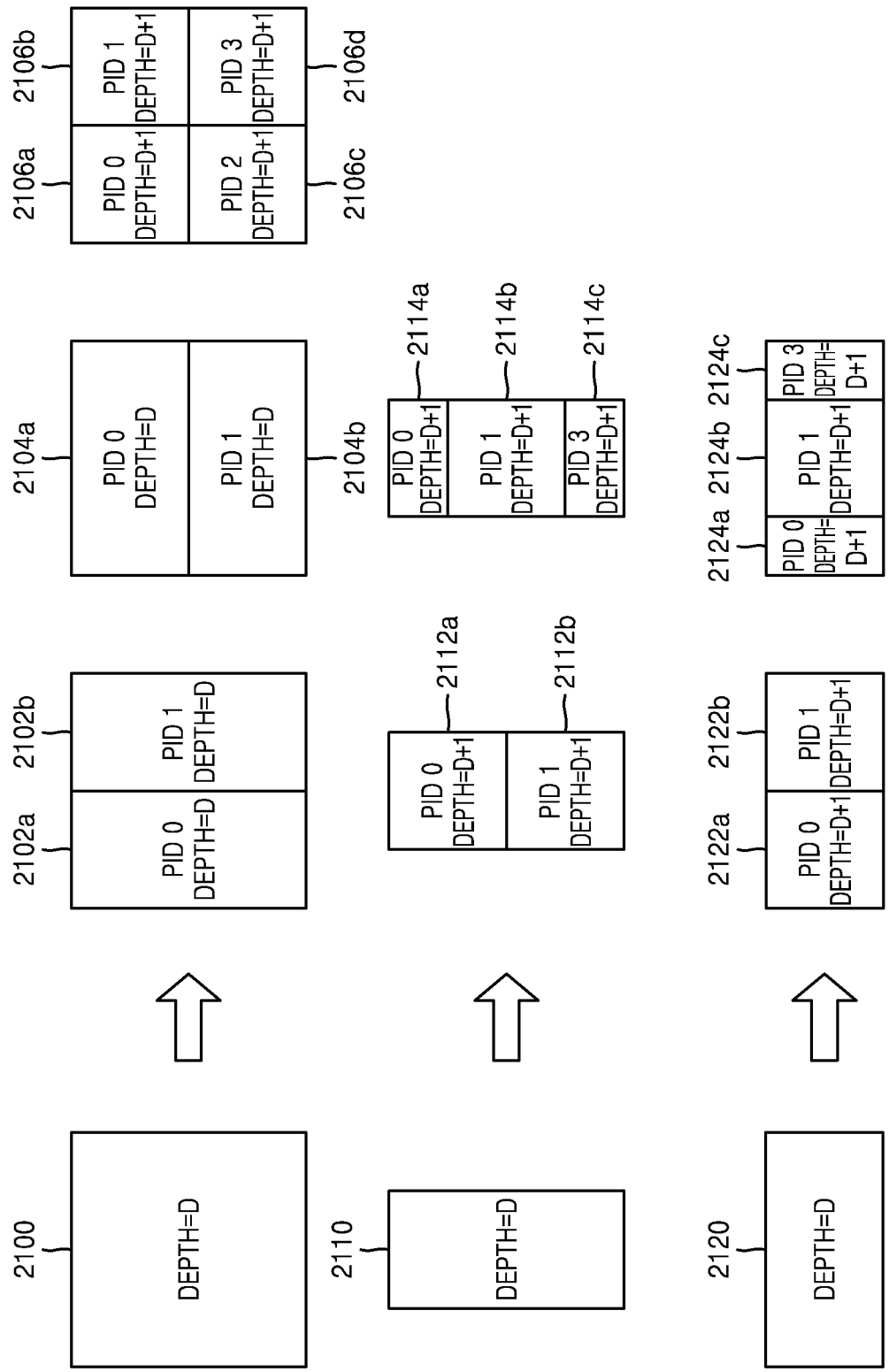
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the video decoding apparatus 100 may determine a second coding unit having various shapes by splitting a first coding unit 2100 having a square shape. Referring to FIG. 21, the video decoding apparatus 100 may determine second coding units 2102a and 2102b, 2104a and 2104b, or 2106a through 2106d by splitting the first coding unit 2100 in at least one of a vertical direction and a horizontal direction, according to split shape information. In other words, the video decoding apparatus 100 may determine the second coding units 2102a and 2102b, 2104a and 2104b, or 2106a through 2106d based on split shape information of the first coding unit 2100.

According to an embodiment, a depth of the second coding units 2102a and 2102b, 2104a and 2104b, or 2106a through 2106d determined according to the split shape information of the first coding unit 2100 having a square shape may be determined based on a length of a long side. For example, since a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the video decoding apparatus 100 splits the first coding unit 2100 into the four second coding units 2106a through 2106d having a square shape, based on the split shape information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100.

According to an embodiment, the video decoding apparatus 100 may split a first coding unit 2110, in which a height is longer than a width, in a horizontal direction into a plurality of second coding units 2112a and 2112b or 2114a through 2114c, according to split shape information. According to an embodiment, the video decoding apparatus 100 may split a first coding unit 2120, in which a width is longer than a height, in a vertical direction into a plurality of second coding units 2122a and 2122b or 2124a through 2124c, according to split shape information.

According to an embodiment, depths of the second coding units 2112a and 2112b, 2114a through 2114c, 2122a and 2122b, or 2124a through 2124c determined according to the split shape information of the first coding unit 2110 or 2120 having a non-square shape may be determined based on a length of a long side. For example, since a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the video decoding apparatus 100 may split the first coding unit 2110 having a non-square shape into an odd number of second coding units 2114a through 2114c, based on split shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The video decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the video decoding apparatus 100 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114*a* and 2114*c*. Accordingly, when the PID of the second coding unit 2114*b* located at the center is 1 according to a scan order, the PID of the second coding unit 2114*c* in a next order may be 3, the PID having increased by 2. In other words, values of the PID may be discontinuous. According to an embodiment, the video decoding apparatus 100 may determine whether an odd number of coding units have the same sizes based on discontinuity of PID for distinguishing the coding units.

According to an embodiment, the video decoding apparatus 100 may determine whether a plurality of coding units determined when a current coding unit is split have certain split shapes based on values of PID. Referring to FIG. 21, the video decoding apparatus 100 may determine the even number of second coding units 2112*a* and 211*b* or the odd number of second coding units 2114*a* through 2114*c* by splitting the first coding unit 2110 having a rectangular shape in which the height is longer than the width. The video decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the video decoding apparatus 100 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the video decoding apparatus 100 may split the first coding unit 2110 into the three second coding units 2114*a* through 2114*c*. The video decoding apparatus 100 may assign a PID to each of the three second coding units 2114*a* through 2114*c*. The video decoding apparatus 100 may compare PIDs of an odd number of coding units so as to determine a center coding unit from among the coding units. The video decoding apparatus 100 may determine, as a coding unit at a center location from among coding units determined when the first coding unit 2110 is split, the second coding unit 2114*b* having a PID corresponding to a center value from among PIDs, based on PIDs of the coding units. According to an embodiment, while determining PIDs for distinguishing coding units, when the coding units do not have the same sizes, the video decoding apparatus 100 may determine PIDs based on a size ratio of the coding units. Referring to FIG. 21, the second coding unit 2114*b* generated when the first coding unit 2110 is split may have the same width as the second coding units 2114*a* and 2114*c*, but may have a height twice higher than those of the second coding units 2114*a* and 2114*c*. In this case, when the PID of the second coding unit 2114*b* located at the center is 1, the PID of the second coding unit 2114*c* in a next order may be 3, the PID having increased by 2. As such, when an increasing range of PIDs differs while uniformly increasing, the video decoding apparatus 100 may determine that a current coding unit is split into a plurality of coding units including a coding unit having a different size from other coding units. According to an embodiment, when split shape information indicates splitting into an odd number of coding units, the video decoding apparatus 100 may split a current coding unit into a plurality of coding units, in which a coding unit at a certain location (for example, a center coding unit) has a size different from other coding units. In this case, the video decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the video decoding apparatus 100 may use a certain data unit from which recursive splitting of a coding unit is started.

Figure 22:
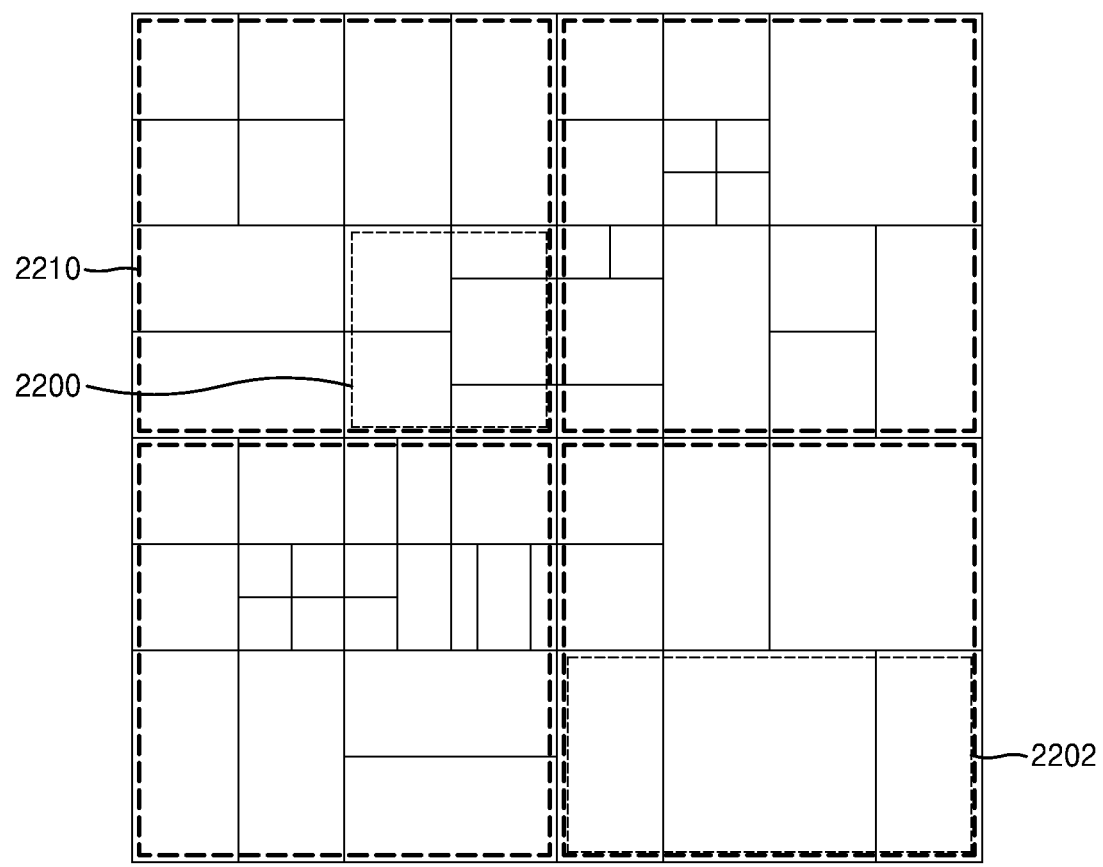
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the video decoding apparatus 100 may split a current picture into a plurality of reference data units. According to an embodiment, the video decoding apparatus 100 may split the plurality of reference data units obtained by splitting the current picture by using split shape information about each of the reference data units. Split processes of such reference data units may correspond to split processes using a quad-tree structure.

According to an embodiment, the video decoding apparatus 100 may pre-determine a smallest size available for the reference data unit included in the current picture. Accordingly, the video decoding apparatus 100 may determine the reference data unit having various sizes that are equal to or larger than the smallest size, and determine at least one coding unit based on the determined reference data unit by using block shape information and split shape information.

Referring to FIG. 22, the video decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the video decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the video decoding apparatus 100 may use a PID for distinguishing the size and shape of the reference coding unit. In other words, the video decoding apparatus 100 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The video decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the video decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the video decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the video decoding apparatus 100 may determine a reference coding unit by splitting a largest coding unit n times according to a quad-tree structure, and split the reference coding unit based on at least one of block shape information and split shape information according to various embodiments.

Figure 23:
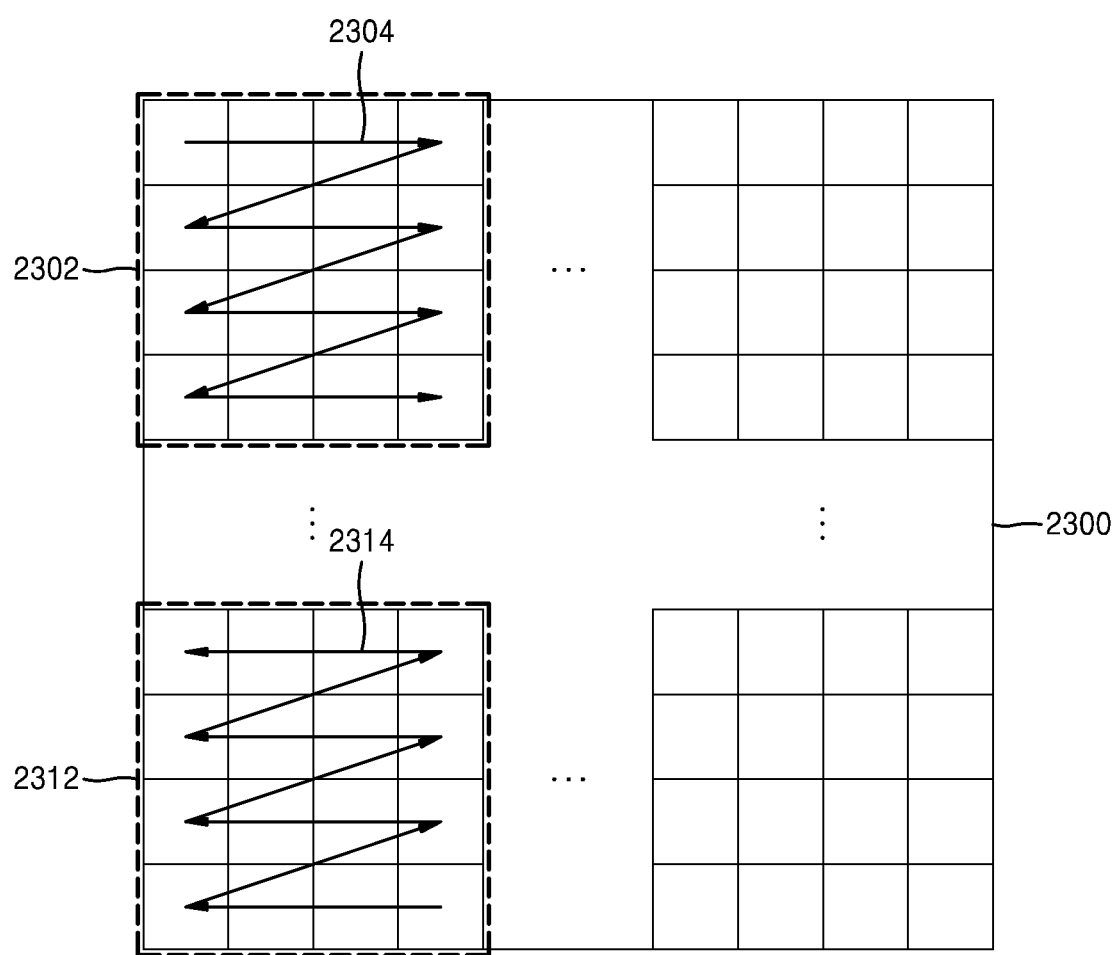
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the video decoding apparatus 100 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the video decoding apparatus 100 may determine a size of at least one processing block included in an image by obtaining information about a size of a processing block. The video decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the video decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the video decoding apparatus 100 may obtain, from the bitstream, the information about a size of a processing block according to such several data units, and the video decoding apparatus 100 may determine the size of at least one processing block splitting the picture by using the obtained information about a size of a processing block, wherein the size of the processing block may be an integer times a size of a reference coding unit.

According to an embodiment, the video decoding apparatus 100 may determine sizes of processing blocks 2302 and 2312 included in the picture 2300. For example, the video decoding apparatus 100 may determine a size of a processing block based on information about a size of a processing block, the information being obtained from a bitstream. Referring to FIG. 23, the video decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The video decoding apparatus 100 may determine a determining order of at least one reference coding unit in at least one processing block.

According to an embodiment, the video decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the video decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the video decoding apparatus 100 may obtain, from a bitstream, information about a determining order of a reference coding unit according to certain data units. For example, the video decoding apparatus 100 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the video decoding apparatus 100 may determine at least one reference coding unit based on the determined order.

According to an embodiment, the video decoding apparatus 100 may obtain, from the bitstream, information about a determining order of a reference coding unit, as information related to the processing blocks 2302 and 2312, and the video decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the video decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The video decoding apparatus 100 may decode determined at least one reference coding unit, according to an embodiment. The video decoding apparatus 100 may decode an image based on reference coding units determined through above embodiments. Examples of a method of decoding a reference coding unit may include various methods of decoding an image.

According to an embodiment, the video decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the video decoding apparatus 100 may use the block shape information or split shape information, which is included in a sequence parameter set, a picture parameter set, a video parameter set, a slice header, and a slice segment header. In addition, the video decoding apparatus 100 may obtain, from a bitstream, and use syntax corresponding to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A video decoding method comprising:
obtaining, from a bitstream, intra chroma multi-transform kernel information indicating whether a chroma transform kernel for inverse transformation of a chroma block encoded in an intra prediction mode is determined to be among a plurality of chroma transform kernels and luma multi-transform kernel information indicating whether a luma transform kernel for inverse transformation of a luma block is determined to be among a plurality of luma transform kernels, the luma block corresponding to the chroma block;
when determining that the chroma transform kernel is determined to be among the plurality of chroma transform kernels according to the intra chroma multi-transform kernel information,
when a size of a chroma transformation block is larger than a 4×4 and the luma transform kernel is determined to be among the plurality of luma transform kernels according to the luma multi-transform kernel information, determining the chroma transform kernel as a luma multi-transform kernel;
when the size of the chroma transformation block is larger than 4×4 and the luma transform kernel is not determined to be among the plurality of luma transform kernels according to the luma multi-transform kernel information, determining a DCT2-type transform kernel as the chroma transform kernel;
when the size of the chroma transformation block is smaller than or equal to 4×4 and a size of a prediction block corresponding to the chroma transformation block is 2N×2N and the luma transform kernel is determined to be among the plurality of luma transform kernels according to the luma multi-transform kernel information, determining the chroma transform kernel as the luma transform kernel;
when the size of the chroma transformation block is smaller than or equal to 4×4, the size of the prediction block corresponding to the chroma transformation block is 2N×2N and the luma transform kernel is not determined to be among the plurality of luma transform kernels according to the luma multi-transform kernel information, determining the DCT2-type transform kernel as the chroma transform kernel;
when the size of the chroma transformation block is smaller than or equal to 4×4 and the size of the prediction block corresponding to the chroma transformation block is not 2N×2N and the luma transform kernel is determined to be among the plurality of luma transform kernels according to the luma multi-transform kernel information, determining a DST7-type transform kernel as the chroma transform kernel; and
when the size of the chroma transformation block is smaller than or equal to 4×4, the size of the prediction block corresponding to the chroma transformation block is not 2N×2N and the luma transform kernel is not determined to be among the plurality of luma transform kernels according to the luma multi-transform kernel information, determining the DCT2-type transform kernel as the chroma transform kernel; and performing inverse transformation on the chroma block by using the chroma transform kernel.

2. A video decoding apparatus comprising:
a parser configured to obtain, from a bitstream, intra chroma multi-transform kernel information indicating whether a chroma transform kernel for inverse transformation of a chroma block encoded in an intra prediction mode is determined to be among a plurality of chroma transform kernels and luma multi-transform kernel information indicating whether a luma transform kernel for inverse transformation of a luma block is determined to be among a plurality of luma transform kernels, the luma block corresponding to the chroma block; and
an inverse transformer configured to, when determining that the chroma transform kernel is determined to be among the plurality of chroma transform kernels according to the intra chroma multi-transform kernel information:
when a size of a chroma transformation block is larger than 4×4 and the luma transform kernel is determined to be among the plurality of luma transform kernels according to the luma multi-transform kernel information, determine the chroma transform kernel as a luma multi-transform kernel;
when the size of the chroma transformation block is larger than 4×4 and the luma transform kernel is not determined to be among the plurality of luma transform kernels according to the luma multi-transform kernel information, determine a DCT2-type transform kernel as the chroma transform kernel;
when the size of the chroma transformation block is smaller than or equal to 4×4 and a size of a prediction block corresponding to the chroma transformation block is 2N×2N and the luma transform kernel is determined to be among the plurality of luma transform kernels according to the luma multi-transform kernel information, determine the chroma transform kernel as the luma transform kernel;
when the size of the chroma transformation block is smaller than or equal to 4×4, the size of the prediction block corresponding to the chroma transformation block is 2N×2N and the luma transform kernel is not determined to be among the plurality of luma transform kernels according to the luma multi-transform kernel information, determine the DCT2-type transform kernel as the chroma transform kernel;
when the size of the chroma transformation block is smaller than or equal to 4×4 and the size of the prediction block corresponding to the chroma transformation block is not 2N×2N and the luma transform kernel is determined to be among the plurality of luma transform kernels according to the luma multi-transform kernel information, determine a DST7-type transform kernel as the chroma transform kernel; and
when the size of the chroma transformation block is smaller than or equal to 4×4, the size of the prediction block corresponding to the chroma transformation block is not 2N×2N and the luma transform kernel is not determined to be among the plurality of luma transform kernels according to the luma multi-transform kernel information, determine the DCT2-type transform kernel as the chroma transform kernel, and perform inverse transformation on the chroma block by using the chroma transform kernel.

3. A video encoding method comprising:
performing transformation on a chroma block by using a certain transform kernel determined independently from a luma transform kernel for transformation of a luma block, and a chroma transform kernel determined by using the luma transform kernel, the luma block corresponding to the chroma block;
generating intra chroma multi-transform kernel information indicating whether the chroma transform kernel is determined to be among a plurality of chroma transform kernels when a size of a chroma transformation block is larger than 4×4 and the luma transform kernel is determined to be among the plurality of luma transform kernels, determining an intra chroma transform kernel as the luma transform kernel for the transformation of the luma block;
when the size of the chroma transformation block is larger than 4×4 and the luma transform kernel is not determined to be among the plurality of luma transform kernels, determining a DCT2-type transform kernel as the chroma transform kernel;
when the size of the chroma transformation block is smaller than or equal to 4×4, a size of a prediction block corresponding to the chroma transformation block is 2N×2N and the luma transform kernel is determined to be among the plurality of luma transform kernels according to luma multi-transform kernel information, determining the intra chroma transform kernel as the luma transform kernel;
when the size of the chroma transformation block is smaller than or equal to 4×4, the size of the prediction block corresponding to the chroma transformation block is 2N×2N and the luma transform kernel is not determined to be among the plurality of luma transform kernels, determining the DCT2-type transform kernel as the chroma transform kernel;
when the size of the chroma transformation block is smaller than or equal to 4×4 and the size of the prediction block corresponding to the chroma transformation block is not 2N×2N and the luma transform kernel is determined to be among the plurality of luma transform kernels, determining a DST7-type transform kernel as the intra chroma transform kernel;
when the size of the chroma transformation block is smaller than or equal to 4×4, the size of the prediction block corresponding to the chroma transformation block is not 2N×2N and the luma transform kernel is not determined to be among the plurality of luma transform kernels, determining the DCT2-type transform kernel as the chroma transform kernel; and
encoding the chroma multi-transform kernel information and a transformation coefficient generated by performing the transformation on the chroma block, the luma multi-transform kernel information indicating whether the luma transform kernel is determined to be among a plurality of luma transform kernels.

* * * * *